US012297663B2

(12) United States Patent
Hong et al.

(10) Patent No.: US 12,297,663 B2
(45) Date of Patent: May 13, 2025

(54) FIELD-HANDABLE GATE LATCH

(71) Applicant: ASSA ABLOY Americas Residential Inc., New Haven, CT (US)

(72) Inventors: Zachary Keoki Hong, Irvine, CA (US); Oscar Romero, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 163 days.

(21) Appl. No.: 17/963,322

(22) Filed: Oct. 11, 2022

(65) Prior Publication Data

US 2023/0035156 A1 Feb. 2, 2023

Related U.S. Application Data

(62) Division of application No. 16/263,777, filed on Jan. 31, 2019, now Pat. No. 11,473,339.

(60) Provisional application No. 62/624,618, filed on Jan. 31, 2018.

(51) Int. Cl.

| | |
|---|---|
| ***E05B 63/04*** | (2006.01) |
| ***E05B 15/00*** | (2006.01) |
| ***E05B 17/20*** | (2006.01) |
| ***E05B 65/00*** | (2006.01) |
| ***E05C 1/10*** | (2006.01) |

(52) U.S. Cl.

CPC ........ *E05B 63/044* (2013.01); *E05B 15/0033* (2013.01); *E05B 17/2049* (2013.01); *E05B 65/0007* (2013.01); *E05C 1/10* (2013.01); *E05Y 2900/40* (2013.01); *Y10T 292/0977* (2015.04); *Y10T 292/1028* (2015.04); *Y10T 292/1097* (2015.04)

(58) Field of Classification Search

CPC ............... E05B 65/0007; E05B 63/044; E05B 17/2038; E05B 17/2057; Y10T 292/1022; Y10T 292/1023; Y10T 292/1028

See application file for complete search history.

(56) References Cited

U.S. PATENT DOCUMENTS

| | | | | |
|---|---|---|---|---|
| 18,157 A | | 9/1857 | Perry | |
| 135,396 A | * | 2/1873 | Bishop | E05C 1/06 292/143 |
| 416,433 A | * | 12/1889 | Wilson | E05B 67/38 70/56 |
| 475,740 A | | 5/1892 | Grove | |
| 524,146 A | | 8/1894 | Hottes | |
| 964,948 A | | 7/1910 | Wainwright | |
| 1,006,816 A | * | 10/1911 | Wolfe | E05B 55/00 292/150 |
| 1,057,330 A | | 3/1913 | Connaghan | |

(Continued)

FOREIGN PATENT DOCUMENTS

| | | | | |
|---|---|---|---|---|
| GB | 2356017 A | * | 5/2001 | E05B 13/002 |

*Primary Examiner* — Carlos Lugo

(74) *Attorney, Agent, or Firm* — Merchant & Gould P.C.

(57) ABSTRACT

A latch includes a housing that has a first side and a second side. The latch includes a bolt assembly that is positioned at least partially within the housing. The bolt assembly includes a bolt movable between an extended position and a retracted position relative to at least one of the first and second sides of the housing. The bolt is biased toward at least one of the extended position and the retracted position, and the bolt is positionable so as to selectively extend from either the first side or the second of the housing in the extended position.

18 Claims, 27 Drawing Sheets

(56) References Cited

U.S. PATENT DOCUMENTS

| | | | | |
|---|---|---|---|---|
| 1,198,509 | A | 9/1916 | Anderson | |
| 1,597,837 | A | 8/1926 | Staley | |
| 2,574,415 | A | 11/1951 | Robinson | |
| 3,086,383 | A * | 4/1963 | Scott | E05C 9/04 70/156 |
| 3,300,238 | A | 1/1967 | Fleskes | |
| 3,623,344 | A | 11/1971 | Wartian | |
| 3,697,106 | A | 10/1972 | Meyer | |
| 3,792,885 | A | 2/1974 | Giardina | |
| 3,844,592 | A | 10/1974 | Giardina | |
| 3,897,093 | A | 7/1975 | Wiczer | |
| 4,136,540 | A | 1/1979 | Coralli | |
| 4,167,281 | A | 9/1979 | Spencer | |
| 4,179,143 | A | 12/1979 | Shy | |
| 4,214,783 | A | 7/1980 | Boegeman | |
| 4,726,613 | A | 2/1988 | Foshee | |
| 4,854,448 | A * | 8/1989 | Hair, II | E05B 65/0014 220/326 |
| 4,854,619 | A | 8/1989 | Nakauchi | |
| 5,092,143 | A * | 3/1992 | Rumbles | E05B 67/38 292/205 |
| 5,141,268 | A | 8/1992 | Keller | |
| 5,809,812 | A | 9/1998 | Gallego | |
| 5,839,306 | A | 11/1998 | Nunuparov | |
| 5,878,612 | A | 3/1999 | Mauer | |
| 6,584,817 | B1 | 7/2003 | Lien | |
| 6,709,034 | B2 | 3/2004 | Michael | |
| 7,523,969 | B2 * | 4/2009 | Thornton | E05B 85/22 292/172 |
| 7,775,564 | B2 * | 8/2010 | Moore | A01K 29/00 70/55 |
| 7,883,124 | B2 | 2/2011 | Gephart | |
| 11,473,339 | B2 | 10/2022 | Hong et al. | |
| 2004/0251694 | A1 | 12/2004 | Gorski | |
| 2017/0198501 | A1 | 7/2017 | Baker | |

* cited by examiner

FIG. 31
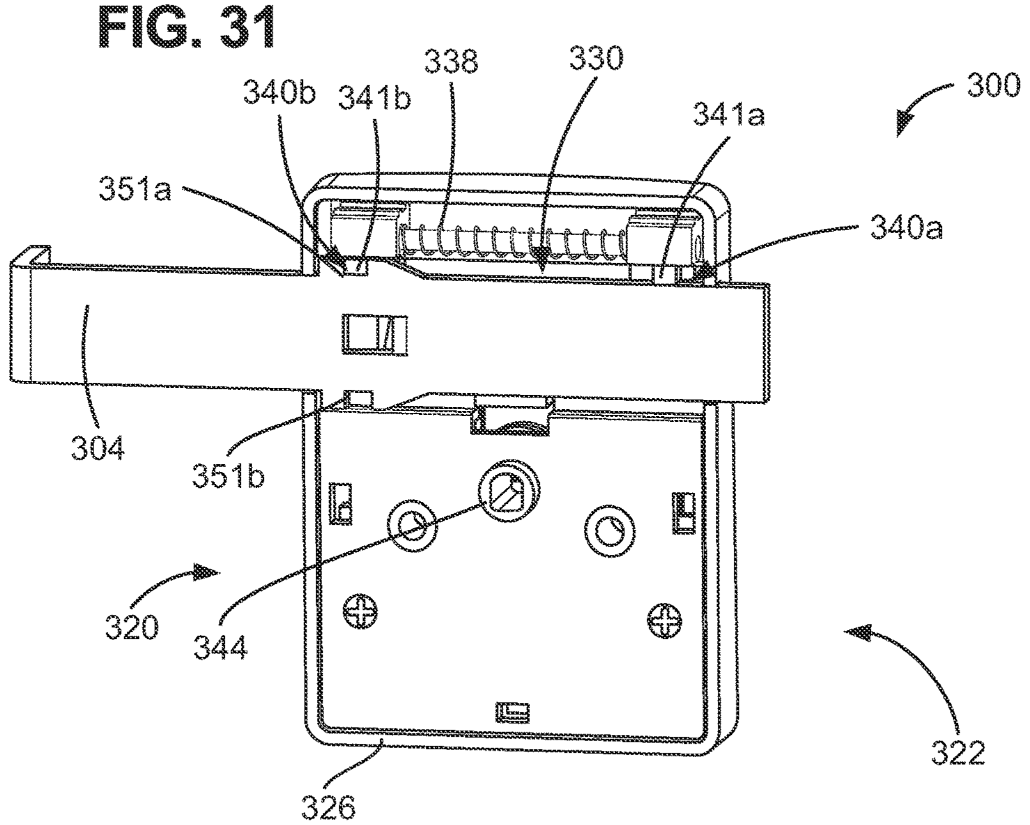
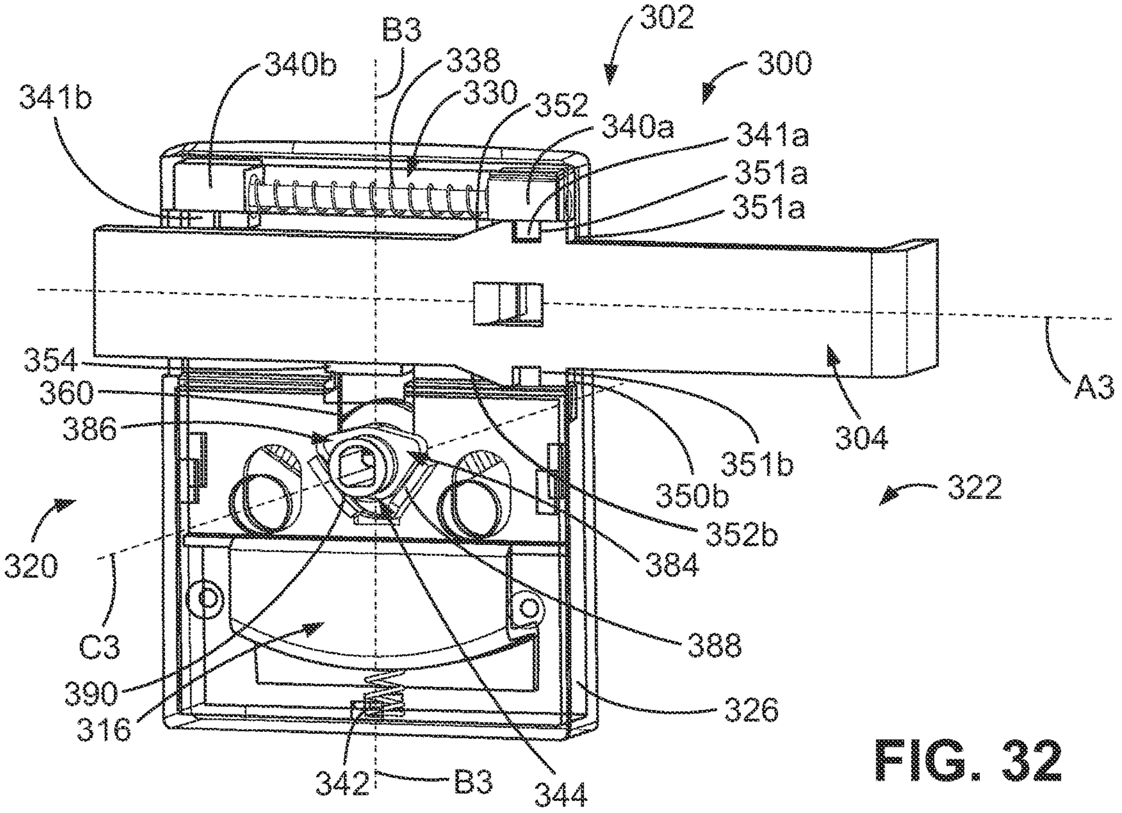
FIG. 32

FIELD-HANDABLE GATE LATCH

CROSS REFERENCE TO RELATED APPLICATION

This application is a divisional of U.S. patent application Ser. No. 16/263,777, filed Jan. 31, 2019, now U.S. Pat. No. 11,473,339, which claims the benefit of U.S. Provisional Patent Application No. 62/624,618, filed Jan. 31, 2018, which applications are hereby incorporated by reference in their entireties.

BACKGROUND

When considering a latch for a hinged barrier for a passageway (e.g., a door, gate, etc.), users have traditionally had to consider the handing of the barrier before choosing a latch. Handing of a barrier refers to the side of the barrier where the hinge is positioned with respect to the user (e.g., a left-handed barrier or a right-handed barrier). Handing has had to be considered because latch hardware is typically provided in either a left-handed configuration or an opposite right-handed configuration. This is specifically true for a locking gate latch having a lock cylinder, where lock cylinder has a specific direction of rotation for both locking and unlocking the gate latch (i.e., different in either left- or right-handed latches). Therefore, the user must make a decision when acquiring latch hardware, often leading to confusion and frustration.

Therefore, improvements in the handability of barrier, specifically gate, latches are desired.

SUMMARY

The present disclosure relates generally to barrier latches. In one possible configuration, and by non-limiting example, a gate latch that includes a field-handable bolt that can be configured in the field to operate in a first handing configuration or a second handing configuration is disclosed.

In one example of the present disclosure, a latch is disclosed. The latch includes a housing that has a first side and a second side. The latch includes a bolt assembly that is positioned at least partially within the housing. The bolt assembly includes a bolt movable between an extended position and a retracted position relative to at least one of the first and second sides of the housing. The bolt is biased toward at least one of the extended position and the retracted position, and the bolt is positionable so as to selectively extend from either the first side or the second of the housing in the extended position. The latch includes a bolt retention assembly. The bolt retention assembly has an engaged position and a disengaged position. When in the engaged position, the bolt retention assembly interfaces with the bolt to prevent movement of the bolt and, when in the disengaged position, the bolt retention assembly disengages from the bolt. The bolt retention assembly is biased toward at least one of the engaged and disengaged positions. The latch includes a bolt movement assembly that is selectively in communication with the bolt to move the bolt between the retracted position and the extended position. The bolt movement assembly is in communication with the bolt retention assembly where, upon movement of the bolt movement assembly, the bolt retention assembly is moved between the engaged and disengaged positions. The bolt retention assembly is movable between the engaged position and the disengaged position separately from the movement of the bolt movement assembly.

In another example of the present disclosure, a latch is disclosed. The latch includes a housing that has a first side and a second side. The latch includes a bolt assembly positioned at least partially within the housing. The bolt assembly includes a bolt movable between an extended position and a retracted position relative to at least one of the first and second sides of the housing. The bolt is biased toward at least one of the extended position and the retracted position, and the bolt is positionable to selectively extend from either the first side or the second side of the housing in the extended position. The latch includes a bolt retention assembly that includes a first body that has an engaged position and a disengaged position. When in the engaged position, a projection of the bolt retention assembly prevents movement of the bolt toward the retracted position, and when in the disengaged position, the first body allows movement of the bolt toward the retracted position. The first body is biased toward at least one of the engaged position and disengaged position. The first body includes a lip that is accessible through an aperture defined in the housing. The latch includes a bolt movement assembly that is selectively in communication with the bolt to move the bolt between the retracted position and the extended position. The bolt movement assembly is in contact with the first body of the bolt retention assembly where, upon movement of the bolt movement assembly, the bolt retention assembly is moved between the engaged and disengaged positions.

In another example of the present disclosure, a method of assigning a handing to a gate latch is disclosed. The method includes providing a housing having a first side and a second side. The method includes providing a bolt assembly in communication with a bolt. The bolt is at least partially positioned within the housing. The bolt is movable between an extended position and a retracted position. When in the extended position, the bolt extends from the first side of the housing. The bolt is biased via the bolt assembly toward the retracted position. The method includes providing a bolt retention assembly that has an engaged position and a disengaged position. When in the engaged position, the bolt retention assembly interfaces with the bolt to prevent movement of the bolt toward the retracted position, and when in the second position, the bolt retention assembly is disengaged from the bolt. The bolt retention assembly is biased toward the engaged position. The method includes disengaging the bolt from the bolt assembly and orienting the bolt within the housing so that the bolt extends from the second side of the housing when in the extended position. The method includes engaging the bolt with the bolt assembly.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 31 is a rear perspective view of the gate latch of FIG. 15 with the bolt in a second handing configuration.

FIG. 32 is a rear perspective view of the gate latch of FIG. 15 with the bolt in the retracted position and a back cover removed.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
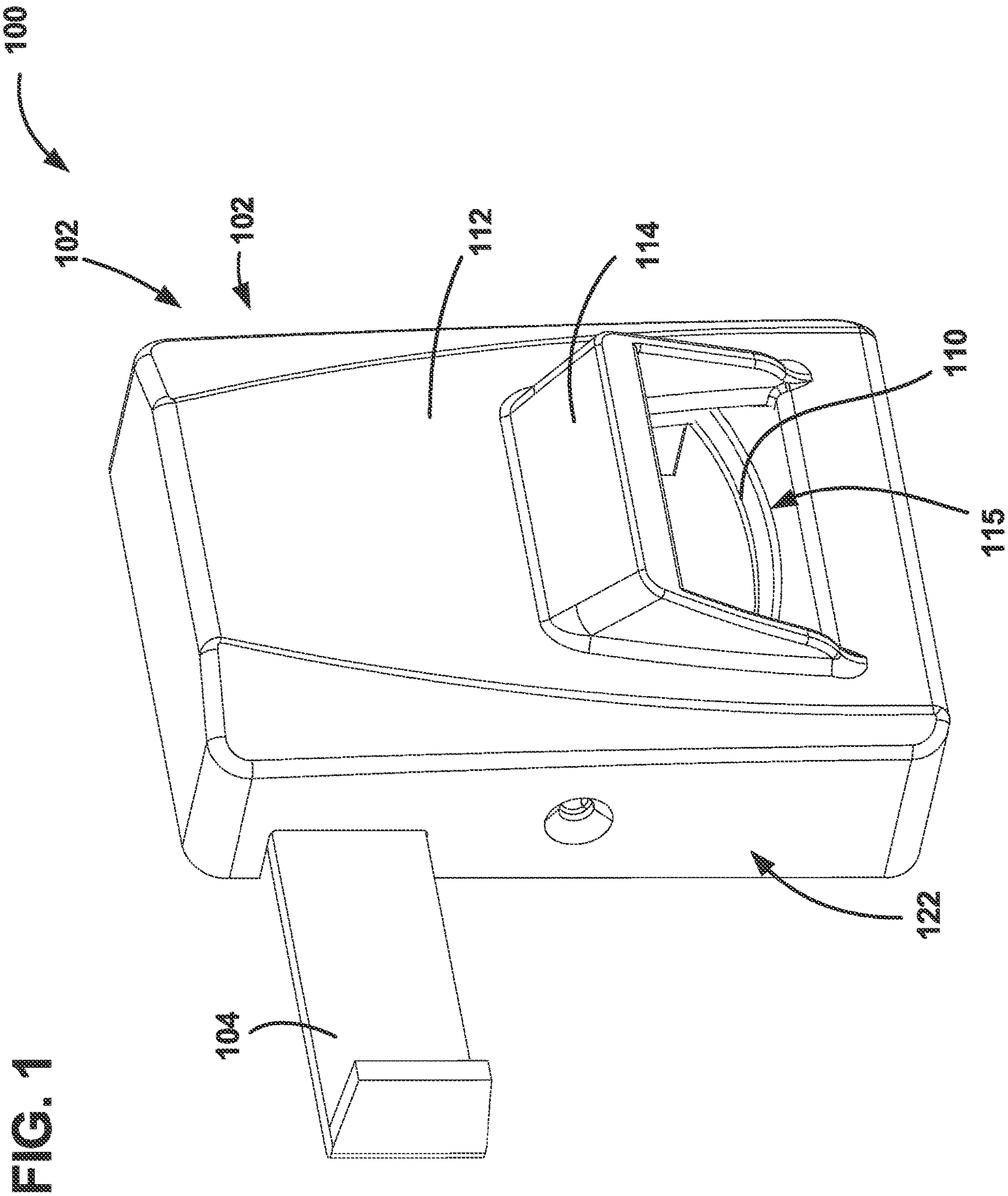
FIG. 1 is a front perspective view of a gate latch, according to one example of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The gate latch disclosed herein includes a plurality of advantages. The gate latch provides a bolt that can be positionable so that the gate latch can be handed in a left-handed configuration or a right-handed configuration without having to invert the gate latch. Further, the gate latch includes a trigger body to operate the gate latch from the locked to the unlocked state from the interior of the gate and a spindle for rotation by way of a handle or lock cylinder so that the gate may be locked and unlocked from the exterior of the gate.

The gate latch disclosed herein is configured to be mounted to a gate that is movable between open and closed positions to at least partially block a passageway. However, it is considered within the scope of the present disclosure, that the gate latch can be used in connection with any barrier that, when in a closed position, at least partially obstructs an opening (e.g., a door, a window, etc.). The gate latch disclosed herein can be utilized in a variety of different applications. For example, the gate latch can be used on a gate positioned within a fence in a residential environment, such as on a backyard gate of a home with a fenced-in backyard. The gate latch is configured to have a main assembly mounted to the interior of the gate and a spindle, at the exterior of the gate, on which a lock cylinder can be attached.

Figure 2:
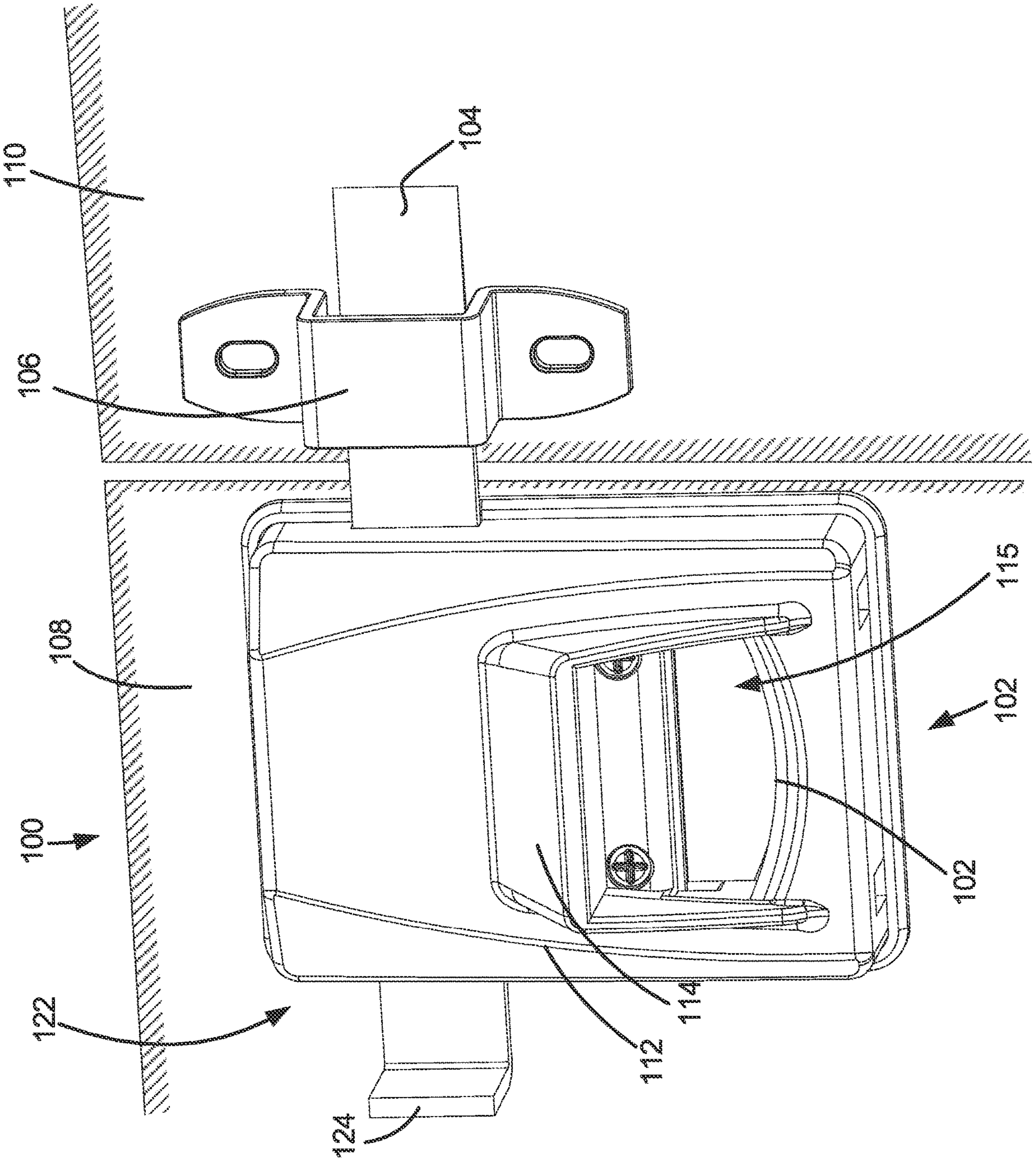
FIG. 2 is another front perspective view of the gate latch of FIG. 1.

FIG. 1 shows a perspective view a gate latch 100 in an unlocked position. FIG. 2 shows a perspective view of the gate latch 100 in the locked position. The gate latch 100 includes an interior assembly 102 and a bolt 104 movably mounted at least partially within the interior assembly 102. When in the locked position, as shown in FIG. 2, the bolt 104 can be received by a receiver 106. When in the unlocked position, the bolt 104 is removed from the receiver 106.

In some examples, the interior assembly 102 and bolt 104 are mounted to an inside of a gate 108. Accordingly, the receiver 106 can be mounted to, or within a gate jamb 110. In some examples, the gate jamb 110 is a post or other portion of a fence or other barrier adjacent the gate 108. The term "outside" is broadly used to mean an area outside the gate, and "inside" is broadly used to denote an area inside the gate. In some examples, the interior assembly 102 can be mounted to the gate jamb 110 and the receiver 106 can be mounted to the gate 108.

The interior assembly 102 includes a housing cover 112 with an aperture 115. The housing cover 112 can have a variety of different shapes and sizes. In some examples, the housing cover 112 can be configured to match other trim types within a particular environment. In some examples, the housing cover 112 can include ornamental features.

Through the aperture 115 of the housing cover 112, a user can access a trigger body 116. As will be described further below, the trigger body 116 can be operated to move the gate latch from the locked to the unlocked position. In some examples, the housing cover 112 can also include a shroud 114 positioned partially around (i.e., above) the aperture 115 to shield the aperture 115 from water ingress. In the depicted configuration, the bolt 104 extends in an extended position from a first side 120 of the interior assembly 102 when the gate latch 100 is in the locked position (FIG. 2). The bolt 104 also retracts to a retracted position on a second side 122 of the interior assembly 102 when the gate latch 100 is in the locked position. When the gate latch 100 is in the unlocked position, the bolt 104 is in a retracted position on the first side 120 of the interior assembly 102 and an extended position on the second side 122 of the interior assembly 102 (FIG. 1).

The bolt 104 can be a variety of different shapes and sizes and be positioned at least partially within the interior assembly 102. In some examples, the bolt 104 is entirely positioned within the housing cover 112 of the interior assembly 102. In some examples, the bolt 104 can include a pushing extension 124 on a side of the bolt 104 that does not interface with the receiver 106. In some examples, the pushing extension 124 can be used by the user to push the bolt 104 into the locked position from the inside of the gate 108.

Figure 3:
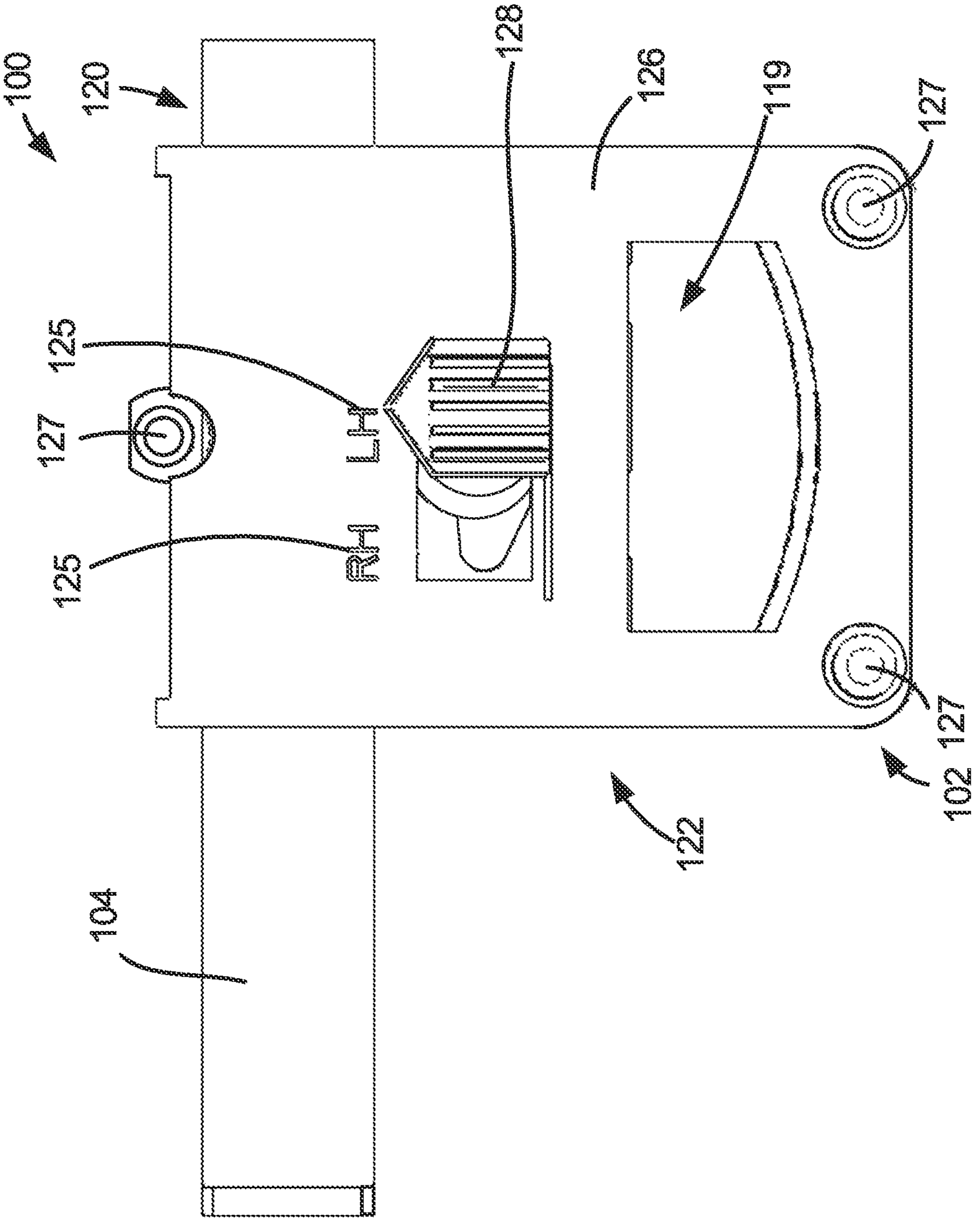
FIG. 3 is a front view of the gate latch of FIG. 1 with a housing cover removed.

FIG. 3 shows the interior assembly 102 with the housing cover 112 removed and the bolt 104 shown in the retracted position. The interior assembly 102 further includes a main housing 126 and a selector switch 128. The main housing 126 includes a plurality of mounting holes 127 to allow the user to mount the gate latch 100 to a surface, such as the gate 108. The main housing 126 further includes an aperture 119 that is aligned with aperture 115 of the housing cover 112 to allow access to the trigger body 116.

The selector switch 128 is configured to alter the handing of the gate latch 100. In some examples, the main housing 126 includes indicia 125 adjacent the selector switch 128. The indicia 125 can be representative of what handing position, either left-handed or right-handed, the selector switch 128 is positioned in. In the depicted example, the selector switch 128 is in a left-handed position 129 and the selector switch 128 can be slid into a right-hand position 131. The selector switch 128 alters the behavior of the internal components of the interior assembly 102 so that the gate latch 100 can be either left- or right-handed.

Figure 4:
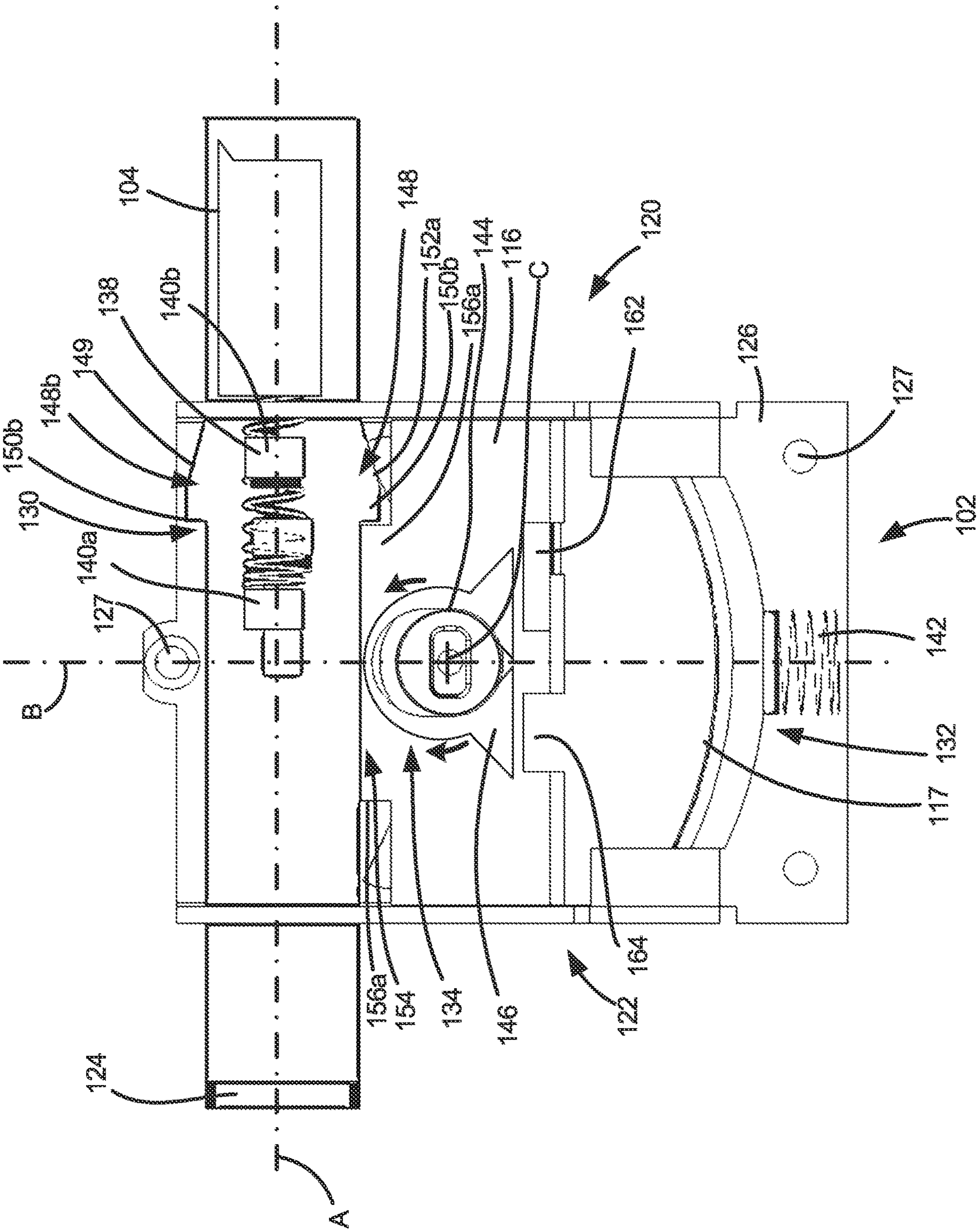
FIG. 4 is a front view of an interior of the gate latch of FIG. 1 with a bolt in an extended position.

FIG. 4 shows a plurality of the internal components of the interior assembly 102. Specifically, the interior assembly 102 includes a bolt assembly 130, a bolt retention assembly 132, and a bolt movement assembly 134. The bolt assembly 130 includes the bolt 104, a bolt biasing spring 138, and a pair of biasing blocks 140*a*, 140*b* in communication with the bolt 204. The bolt retention assembly 132 includes the trigger body 116 and a trigger body biasing spring 142. The bolt movement assembly 134 includes a spindle 144 and a spindle cam 146.

In general, the three assemblies 130, 132, 134 within the interior assembly 102 operate along different operational axes. The bolt assembly 130, specifically the bolt 104, moves longitudinally along a bolt axis A. The bolt retention assembly 132 moves longitudinally, specifically the trigger body 116, along a bolt retention axis B, while the bolt movement assembly 134 generally rotates around a central axis C. The bolt axis A and the bolt retention axis B are generally transverse to one another. In some examples, the bolt axis A and the bolt retention axis B are generally perpendicular to one another.

The bolt 104 of the bolt assembly 130 includes a pair of projections 148*a*, 148*b*. The projections 148*a*, 148*b* are configured to interface with the trigger body 116. The projections 148*a*, 148*b*, which are positioned on opposite top and bottom sides of the bolt 104, allow the position of the bolt 104 to be reversed and retained in an extended position, to facilitate locking of the gate latch 100. In some examples, the projections 148*a*, 148*b* can each include a stop surface 150*a*, 150*b* and a ramped surface 152*a*, 152*b*. As noted above, the bolt can be removed from the housing and flipped so that the stop surfaces 150*a*, 150*b* and ramped surfaces 152*a*, 152*b* are facing the opposite direction along the bolt axis A.

Figure 6:
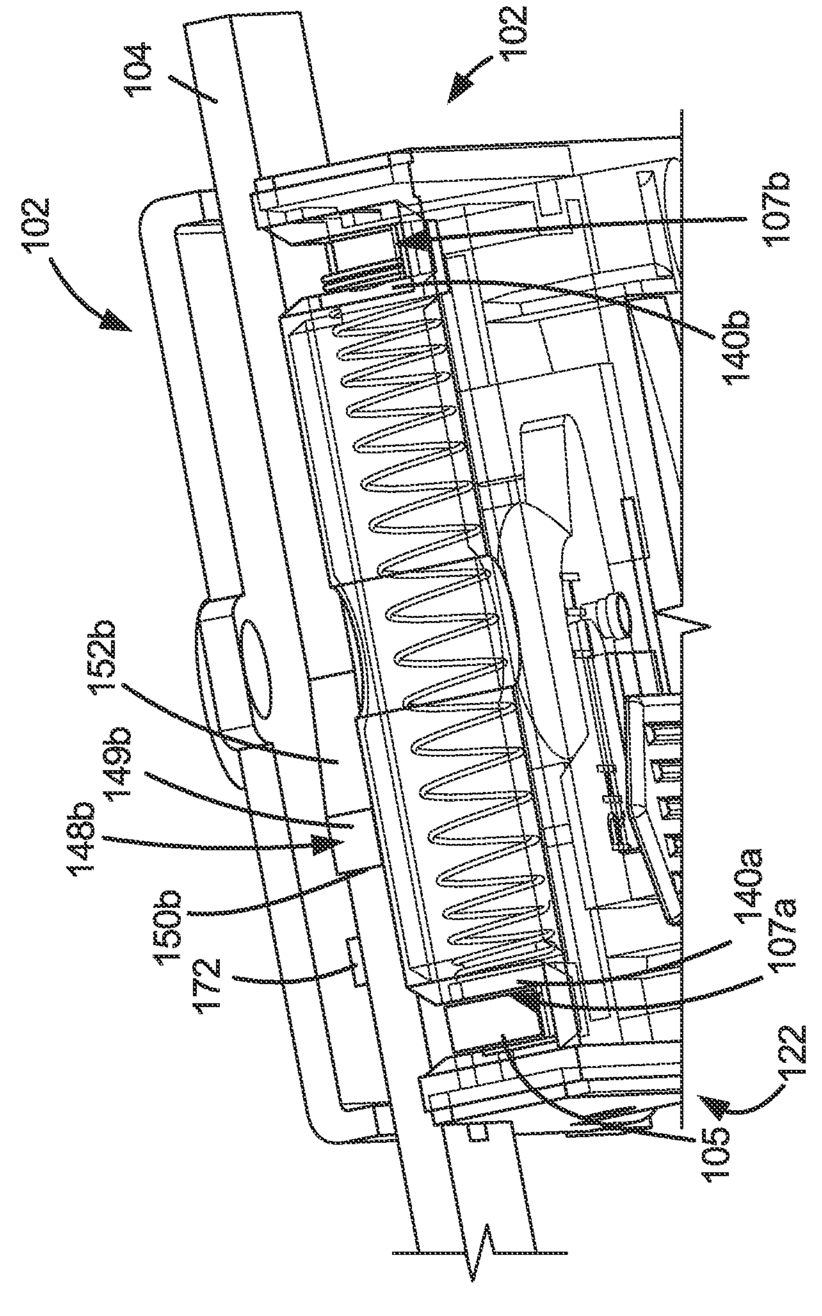
FIG. 6 is a top perspective view of a portion of the interior of the gate latch of FIG. 1 with the bolt in the retracted position.

As shown in FIG. 6, the bolt 104 also includes a tab 105 that interfaces with one of the biasing blocks 140*a*, 140*b* to allow the bolt biasing spring 138 to bias the bolt 104 toward the retracted position. In some examples, each biasing block 140*a*, 140*b* includes a recess 107*a*, 107*b* to receive the tab 105 of the bolt 104. Because the bolt 104 can be flipped with respect to the main housing 126 when changing the handing of the gate latch 100, the tab 105 can be received by either biasing block 140*a*, 140*b*.

As shown, the bolt biasing spring 138 is positioned between the biasing blocks 140*a*, 140*b*. As the distance between the biasing blocks 140*a*, 140*b* is reduced, the biasing spring 138 exerts an increasing force on the blocks 140*a*, 140*b* as the spring 138 is compressed. As shown in FIG. 4, the bolt 104 is handed to extend from the first side 120 of the interior assembly 102 and therefore the bolt 104 only interfaces within biasing block 140*a*. As the bolt 104 moves between the retracted and extended positions, the biasing block 140*a* also moves. Therefore, when in the extended position from the first side 120 of the interior assembly 102, the biasing block 140*a* is positioned close to the biasing block 140*b*, thereby placing biasing spring 138 in compression between the biasing blocks 140*a*, 140*b*.

Figure 5:
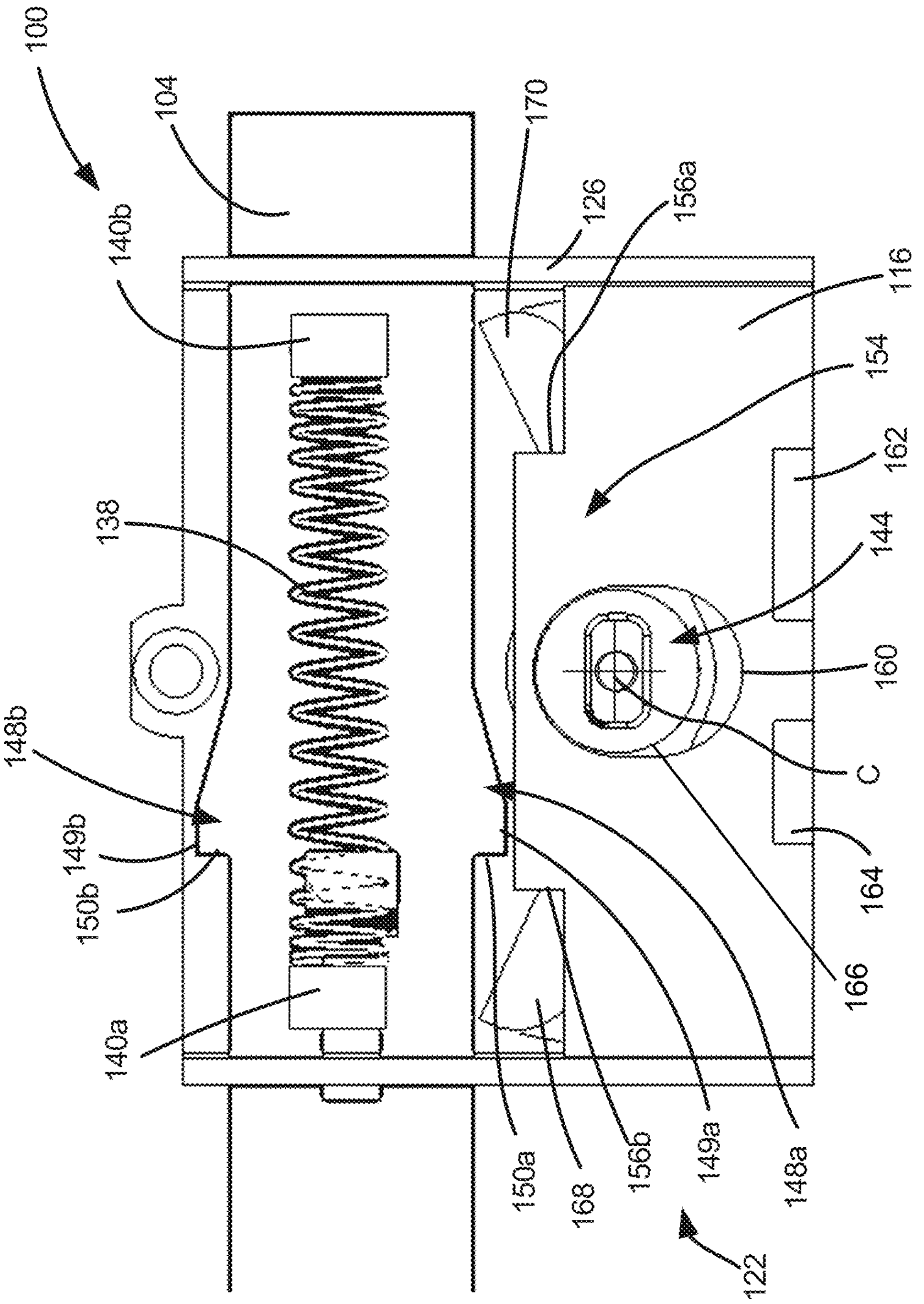
FIG. 5 is a front view of a portion of the interior of the gate latch of FIG. 1 with the bolt in a retracted position.

FIG. 5 shows the bolt 104 in the retracted position, and the biasing blocks 140*a*, 140*b* are shown spaced at a distance greater than the distance they are spaced when the bolt is in the extended position.

The bolt retention assembly 132 is configured to retain the bolt 104 in the extended position. The trigger body 116 is movable along the bolt retention axis B between a first position (shown in FIG. 4) and a second position (shown in FIG. 5). In some examples, the trigger body biasing spring 142 biases the trigger body 116 toward the first position.

To retain the bolt 104 in the extended position, the trigger body 116 interfaces with the bolt 104 to keep the bolt 104 from automatically moving (thanks to the bolt biasing spring) to the retracted position. Specifically, the trigger body 116 includes a projection 154 that contacts either stop surface 150*a*, 150*b* of each projection 148*a*, 148*b* of the bolt 104 when the bolt 104 is in the extended position. Because the position of the bolt 104 is reversible within the interior assembly 102, the projection 154 of the trigger body 116 includes a pair of stop surfaces 156*a*, 156*b* to interface with either stop surface 150*a* or stop surface 150*b*, depending on the handing of the bolt 104 (and thereby the direction of movement) within the interior assembly 102.

Because the axes A and B are transverse, and because the housing 126 retains the trigger body 116, the trigger body 116 is configured to hold the bolt 104 in the extended position. To allow the bolt 104 to return to the retracted position, the trigger body 116 is moved to the second position, in a direction toward the trigger body biasing spring 142 along the bolt retention axis B, to move the stop surfaces 156*a*, 156*b* so they no longer contact the stops surfaces 150*a*, 150*b*, of the bolt 104, thereby allowing the bolt 104 to move to the retracted position. The trigger body 116 can be moved from the first position to the second position upon receiving an input force from a user at a lip 117. The user can access the lip 117 of the trigger body 116 through apertures 115, 119 defined by the housings 112, 126. As shown in FIG. 5, when in the second position, the trigger body 116 remains in the second, lowered position as the projection 154 contacts a top 149*a*, 149*b* of the projection 148*a*, 148*b*. The trigger body 116 can be moved from the first position to the second position independently or via the spindle 144, as will be discussed in more detail herein.

As shown, the trigger body 116 is positioned around the spindle 144.

Specifically, the spindle 144 is positioned within a slot 160 that is sized larger than the spindle 144. The slot 160 is sized and shaped to allow the trigger body 116 to move between the first and second positions along the bolt retention axis B without moving the spindle 144. This allows the trigger body 116 to be moved between the first and second positions independently from the operation of the spindle 144. The trigger body 116 does, however, include a pair of arms 162, 164 that are configured to separately interface with the cam 146. Which arms 162, 164 interface with the cam 146 depends on the position of the selector switch 128 and the rotation direction of the cam 146. Therefore, when rotated in a particular direction around the central axis C, the spindle 144 and cam 146 can exert a force on one of the arms 162, 164 to move the trigger body 116 from the first position to the second position.

The spindle 144 of the bolt movement assembly 134 is configured to be rotationally positioned within the main housing 126. In some examples, the spindle 144 can be exposed from the housing 126 at an opposite side from the apertures 115, 119 (i.e., a backside). The gate latch 100 can be installed so that when the interior assembly 102 is secured to the inside of the gate 108, the spindle 144 can be accessed from the outside of the gate 108. At the outside of the gate 108, the spindle 144 can be connected to a lock cylinder (not shown) or handle (not shown). A verified user (i.e., the one holding the valid key to the lock cylinder) can actuate the spindle by a mechanical key to lock or unlock the gate latch 100 from outside of the gate 108 by turning the spindle 144 in either the counter-clockwise or clockwise direction. It is also contemplated that the spindle 144 may be connected to other locking mechanisms such as a keypad, a handle, and/or an electronic locking mechanism.

As shown in FIG. 5, the spindle 144 includes a main cylindrical body 166 and a pair of lever arms 168, 170. The lever arms 168, 170 are configured to interface with the bolt 104 via a spindle bolt projection 172, shown in FIG. 6, positioned at the back, opposite side of the bolt 104 from the tab 105. In the depicted example, only lever arm 168 is configured to interface with the spindle bolt projection 172 on the bolt 104 to move the bolt 104 from the retracted position to the extended position so as to allow a user to lock the gate latch from the outside of the gate. When the handing of the gate latch 100 is reversed, only the extension 170 of the spindle 144 will selectively interface with the spindle bolt projection 172. When in the depicted handed configuration, there remains no other stop or projection on the bolt 104 to impede the movement of extension 170, no matter what direction the spindle 144 is rotated in.

Figure 7:
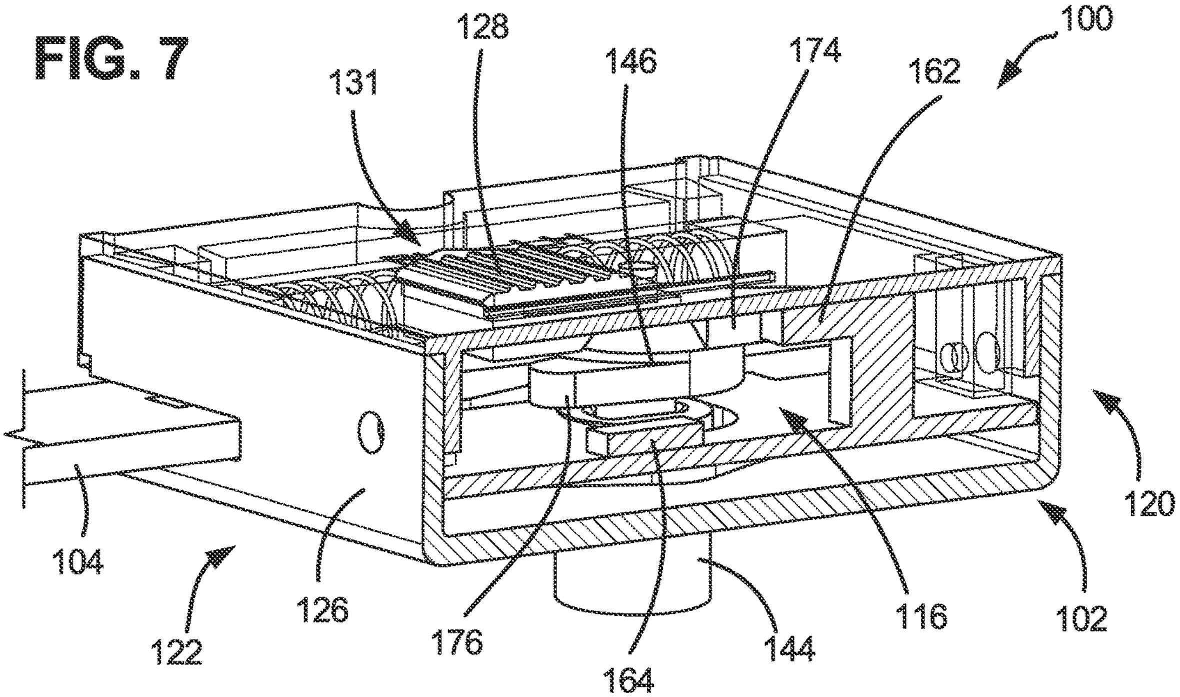
FIG. 7 is a bottom perspective view of a portion of the interior of the gate latch of FIG. 1 with a cam in a first position.
Figure 8:
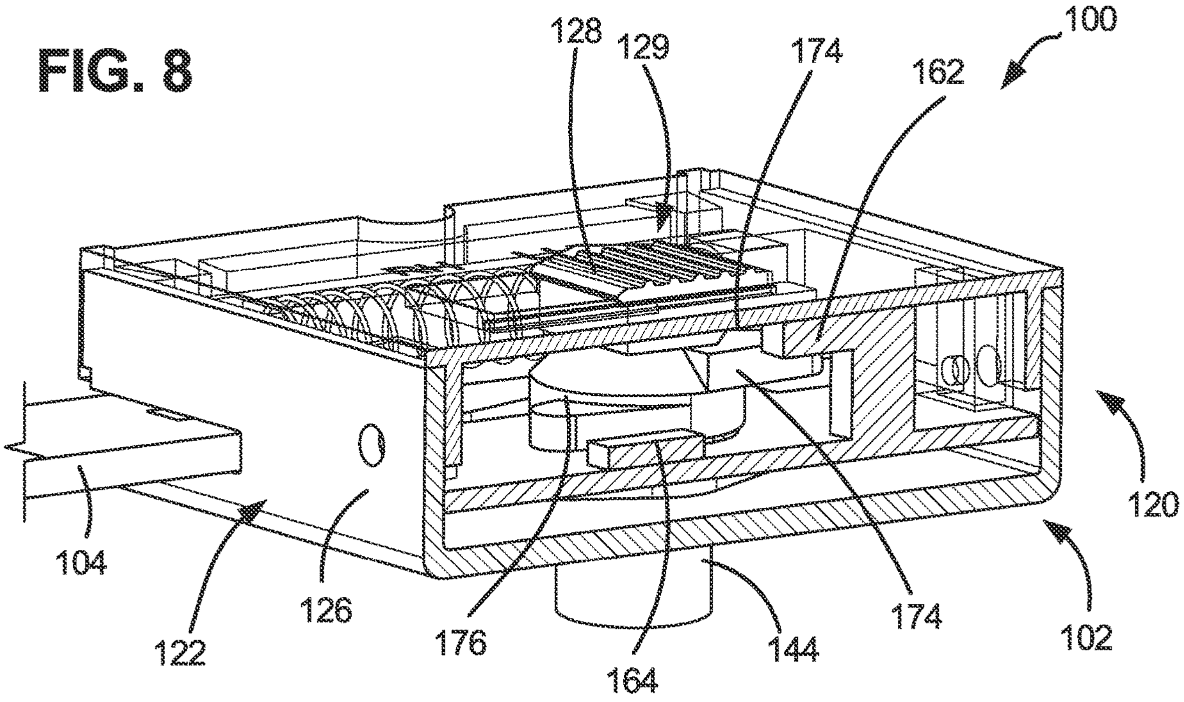
FIG. 8 is a bottom perspective view of a portion of the interior of the gate latch of FIG. 1 with the cam in a second position.

FIGS. 7 and 8 show the position of the cam 146 when the selector switch 128 is cycled between the left-handed position 129 and the right-handed position 131. While the lever arms 168, 170 of the spindle 144 are responsible for extending the bolt 104, the cam 146 is responsible for facilitating the movement of the bolt 104 from the extended position to the retracted position (i.e., unlocking the gate latch 100). As described above, the trigger body 116 is biased to the first position and must be moved to the second position in order for the bolt 104 to automatically move from the extended position to the retracted position.

The cam 146 is rotationally fixed to the spindle 144 so that the cam 146 rotates with the spindle 144. However, the cam 146 is also configured so that the cam 146 can move axially with respect to the spindle 144. Specifically, the cam 146 has a left-handed position and a right-handed position along the central axis C of the bolt movement assembly 134. In some examples, the cam 146 can be spring-loaded (e.g., a spring can be positioned between the spindle 144 and the cam 146) and biased toward either a left-handed position or a right-handed position. The cam includes a first leg 174 and a second leg 176.

As shown in FIG. 7, when the selector switch 128 is in the right-handed position 131, the cam 146 is also in the right-handed position and the first leg 174 resides on the same plane as arm 162 of the trigger body 116. The second leg 176 and arm 164 of the trigger body remain misaligned and in different planes. Therefore, when the first leg 174 is rotated in a direction toward the arm 162 (i.e., an unlocking direction), the first leg 174 is configured to contact the arm 162. As the first leg 174 is further rotated, the leg 174 moves the trigger body 116 via the arm 162 to the second position, thereby causing the bolt 104 to move from the extended position to the retracted position. Because the leg 176 and arm 164 are misaligned, rotation in the opposite direction (i.e., a locking direction) will not cause movement of the trigger body 116. Rotation in the locking direction is rotation representative of the user locking the gate latch 100 and, as discussed above, the lever arm 168 of the spindle 144 will contact the bolt 104 to move the bolt 104 from the retracted position back to the extended position. Because the trigger body 116 is spring biased and held in the second position when the bolt 104 is retracted, once the bolt is in the extended position, the trigger body 116 automatically moves to the first position and locks the bolt 104 in the extended position.

As shown in FIG. 8, when the selector switch 128 is in the left-handed position 129, the cam 146 is also in the left-handed position and the second leg 176 resides on the same plane as arm 164 of the trigger body 116. The first leg 174 and arm 162 of the trigger body 116 remain misaligned and in different planes. Therefore, what was the locking direction in the right-handed position 131, is now the unlocking direction, causing the second leg 176 and arm 164 to make contact and cause the trigger body 116 to move to the second position. Similarly, what was the unlocking direction in the right-handed position 131, is now the locking direction because the arm 162 and first leg 174 of the cam 146 are misaligned.

Figure 9:
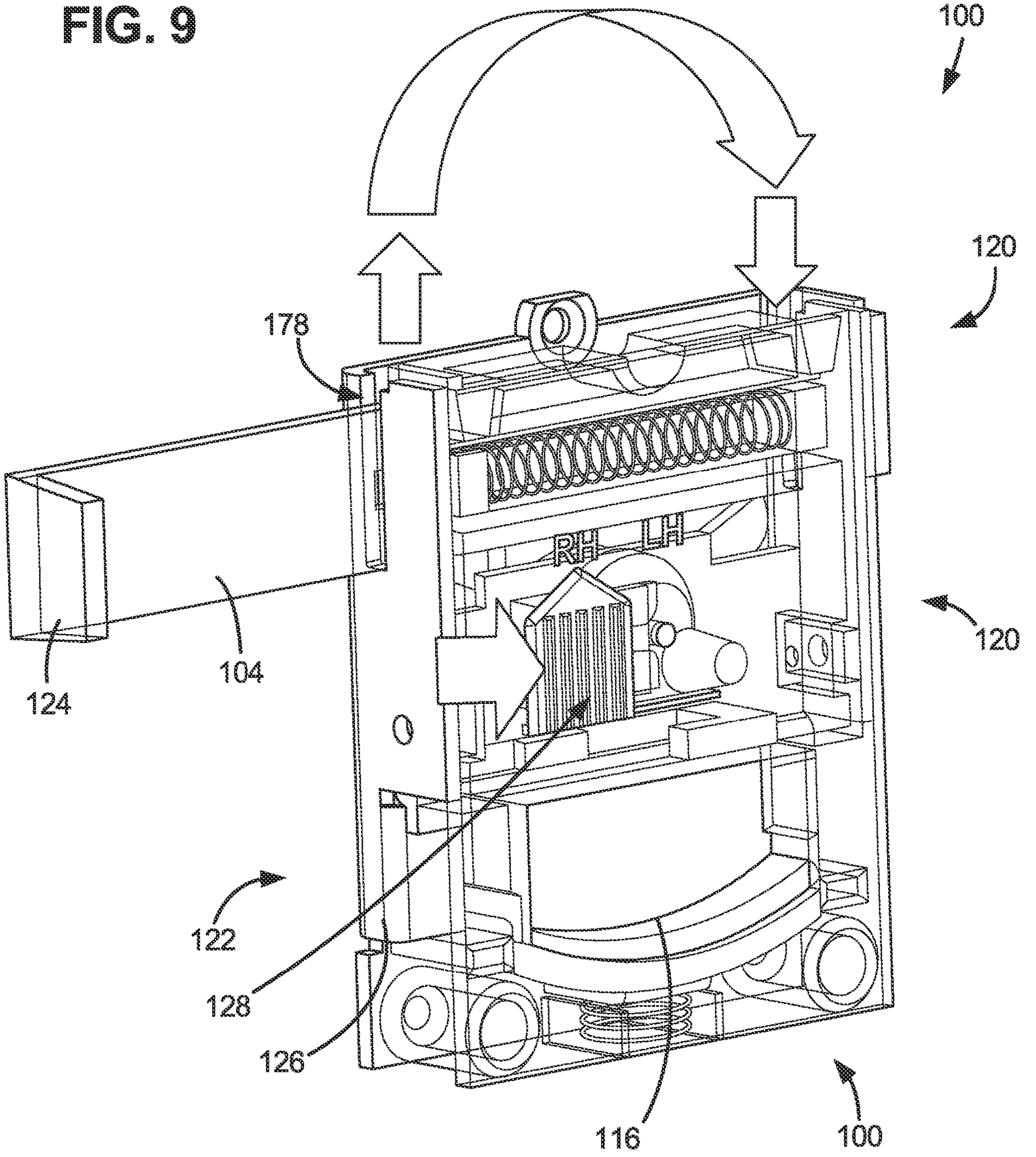
FIG. 9 is front perspective view of the gate latch of FIG. 1 illustrating reversing the bolt.

FIG. 9 shows the process of reversing the position bolt 104 with respect to the main housing 126. As shown, the housing cover 112 is removed from the main housing 126 so the bolt 104 can be removed from the main housing via open slots 178 at the first and second sides 120, 122 of the gate latch 100. Once removed, the bolt 104 is flipped and the tab 105 (shown in FIG. 6) is positioned within the recess 107 of the opposite biasing block 140*a*, 140*b*. As shown in FIG. 9, the tab 105 is removed from the recess 107*a* of the biasing block 140*a*, the bolt 104 is flipped so that the extension 124 of the bolt is at the first side 120 of the gate latch, and the tab is inserted into the recess 107*b* of the biasing block 140*b*. Once the bolt has switched positions, the user can move the selector switch to the proper handing position 129, 131 and the handing process is complete.

Figure 10:
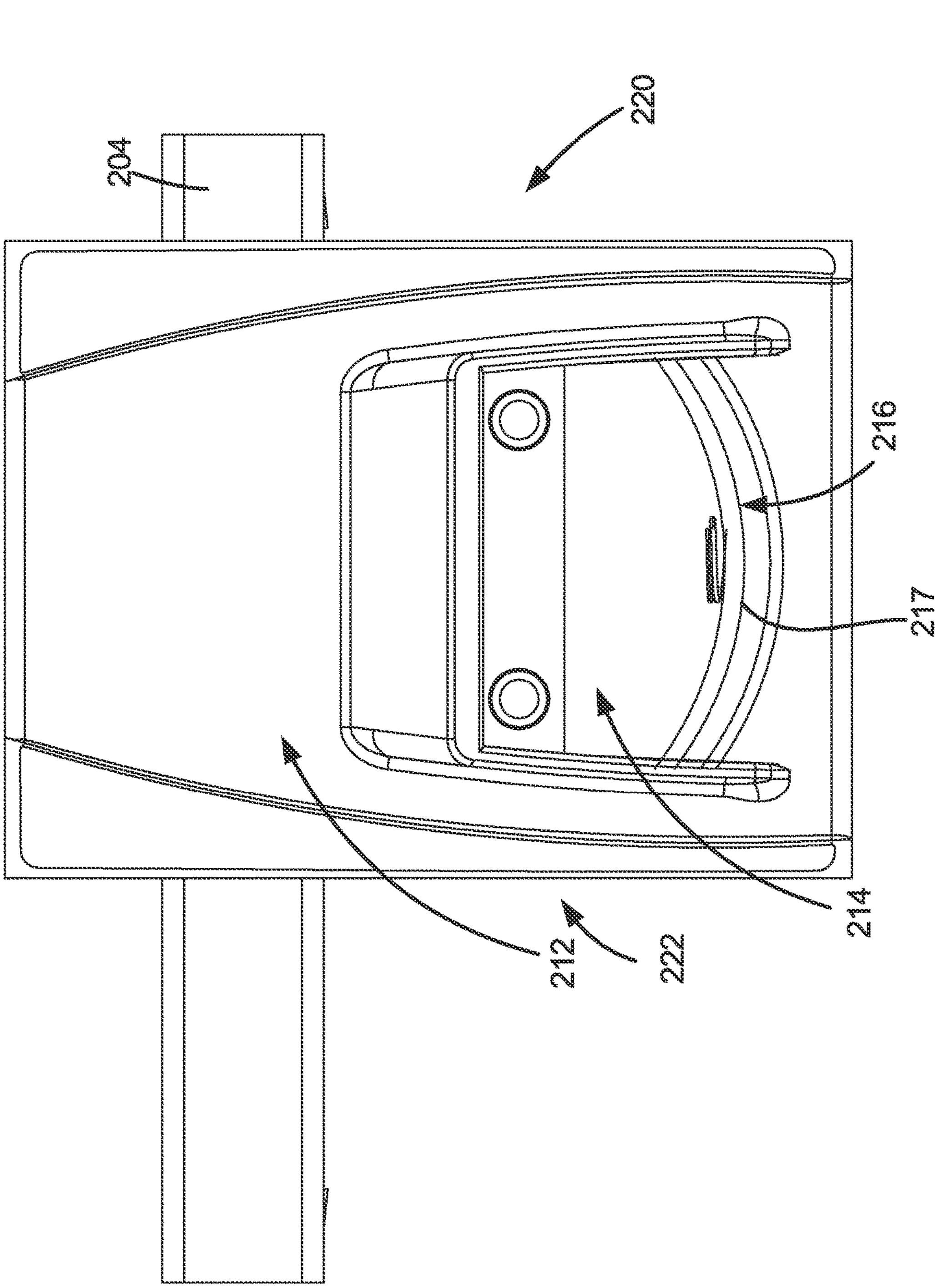
FIG. 10 is a front view of another gate latch, according to one example of the present disclosure.

FIG. 10 shows a front view of a gate latch 200, according to another embodiment of the present disclosure. The gate latch 200 includes an interior assembly 202 and a bolt 204 movably mounted at least partially within the interior assembly 202. The interior assembly 202 and the bolt 204 are similar to the interior assembly 102 and bolt 104, described above. The bolt 204 can extend to either a first side 220 or a second side 222 of the interior assembly 202 to allow the user to change the handing of the gate latch 200 in the field. The bolt 204 can be received by a receiver (not shown) when in a locked, or extended, position. Like the gate latch 100, described above, the gate latch 200 can be operated by a trigger body 216 or a spindle 244 so that the user can quickly unlock the gate latch 200 from the inside of the gate and further unlock, or lock, the gate latch 200 from the outside of the gate. When in the unlocked position, the bolt 204 is removed from the receiver.

The gate latch 200 includes the trigger body 216, similar to trigger body 116 described above, that is accessible through an aperture 214 in a housing cover 212. The trigger body 216 is configured to interact with the components in the interior assembly 202 to unlock the gate latch 200 when a user exerts a downward force on a lip 217, thereby allowing the bolt 204 to move from an extended position at a particular side 220, 222 of the gate latch 200 to a retracted position with respect the same side 220, 222. In some examples, the user can also introduce a force to the lip 217 of the trigger body 216 and manually move the bolt 204 from the retracted position to the extended position, thereby allowing the user to lock the gate latch 200 from inside the gate. In some examples, the user can manually move the bolt 204 to the extended position, without moving or exerting a force on the trigger body 216.

Figure 11:
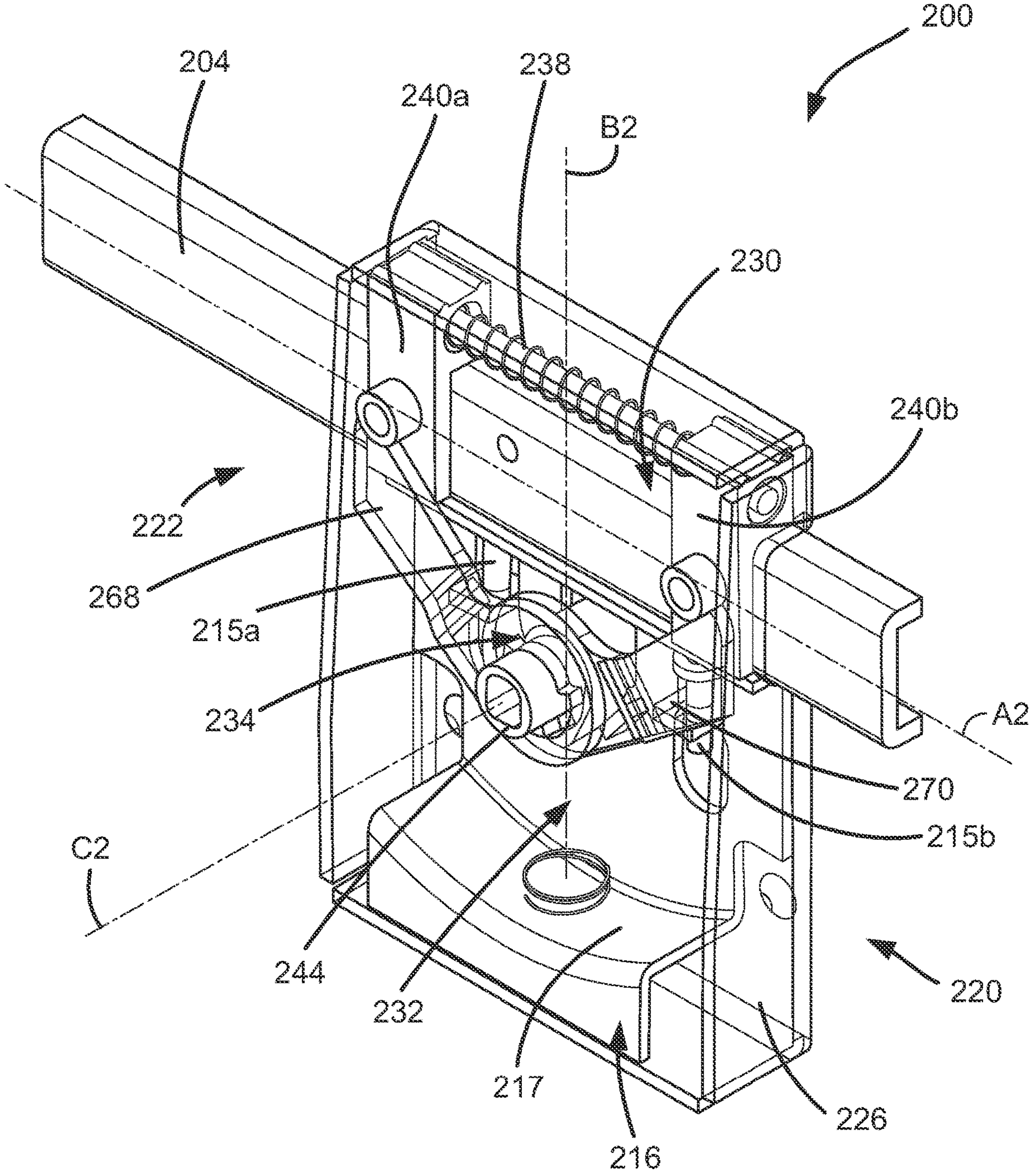
FIG. 11 is a front perspective view of the gate latch of FIG. 10 with a housing cover removed.
Figure 12:
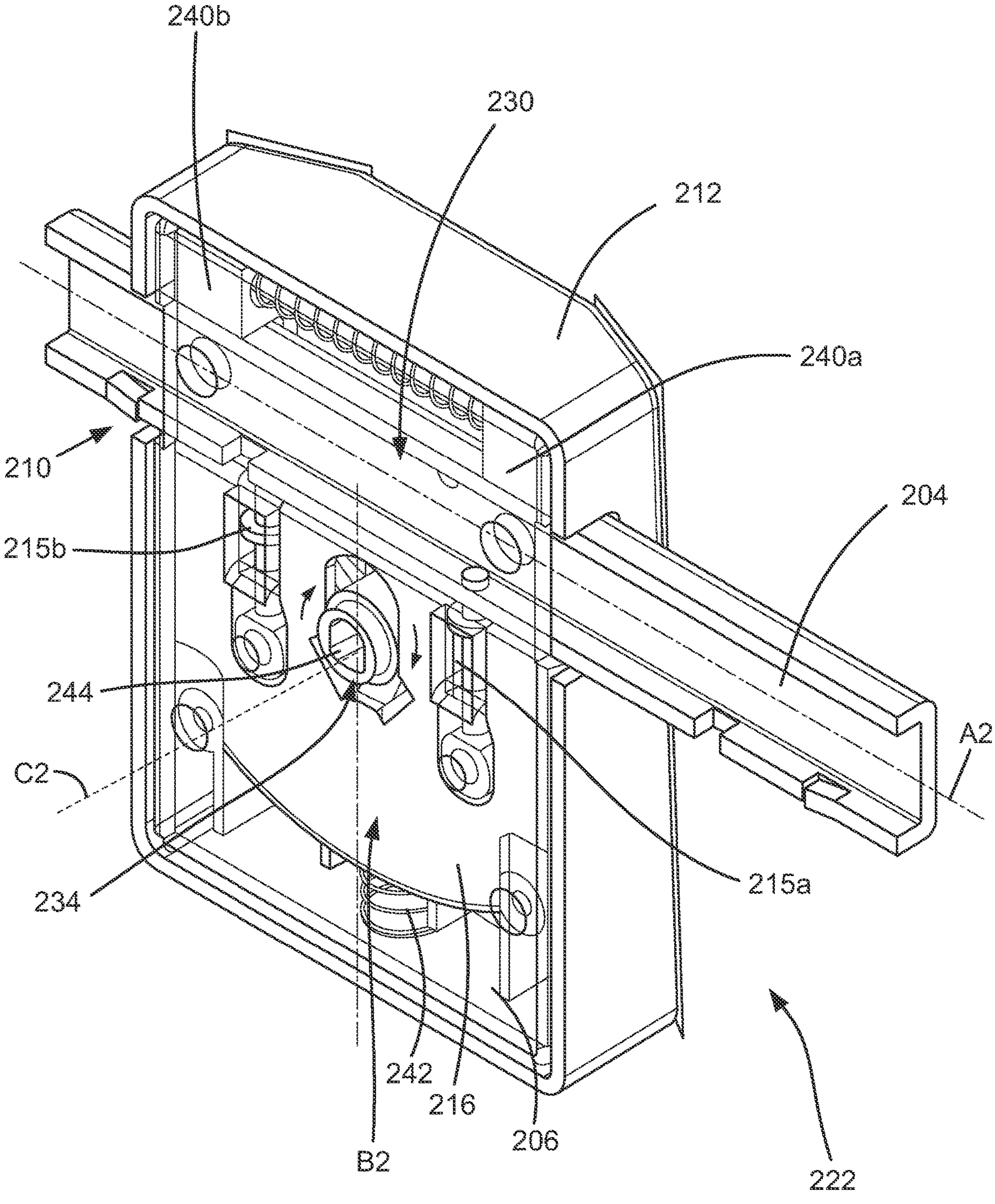
FIG. 12 is a rear perspective view of the gate latch of FIG. 10.

FIG. 11 shows a perspective front view of the gate latch 200 with the housing cover 212 removed and a main housing 226 shown as transparent. FIG. 12 shows a rear perspective view of the gate latch 200 with a rear housing 206 shown as transparent.

In FIGS. 10-12, the gate latch 200 is shown to be in a handed configuration where the bolt 204 moves between an extended position and a retracted position at the first side 220 of the gate latch 200. In such a configuration, the bolt 204 can interface with a receiver adjacent the first side 220 when the bolt 204 is in the extended position. The bolt 204 is shown in the retracted position, with respect to side 220, in FIGS. 10-12.

Like the gate latch 100 described above, the gate latch 200 includes a bolt assembly 230, a bolt retention assembly 232, and a bolt movement assembly 234. The bolt assembly 230 includes the bolt 204, a bolt biasing spring 238, and a pair of biasing blocks 240*a*, 240*b*. The bolt retention assembly 232 includes the trigger body 216, a pair of retention pins 215*a*, 215*b*, and a trigger body biasing spring 242. The bolt movement assembly 234 includes the spindle 244, a first lever arm 268, and a second lever arm 270.

In general, the three assemblies 230, 232, 234 within the interior assembly 202 operate along different operational axes. The bolt assembly 230, specifically the bolt 204, moves longitudinally along a bolt axis A2. The bolt retention assembly 232 moves longitudinally, specifically the trigger body 216, along a bolt retention axis B2, while the bolt movement assembly 234 generally rotates around a central axis C2. The bolt axis A2 and the bolt retention axis B2 are generally transverse to one another. In some examples, the bolt axis A2 and the bolt retention axis B2 are generally perpendicular to one another.

Figure 13:
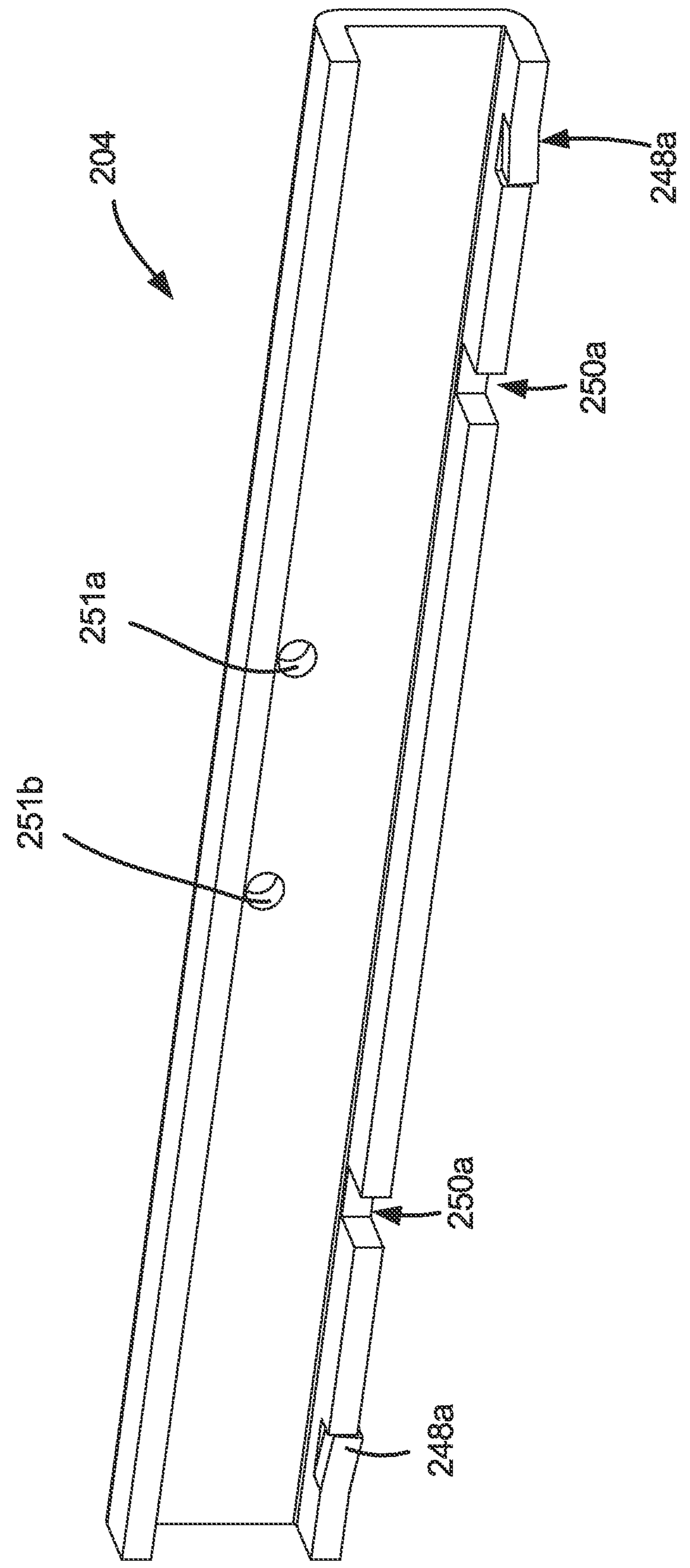
FIG. 13 is a rear perspective view of a bolt of the gate latch of FIG. 10.

FIG. 13 shows a perspective view of the bolt 204. The bolt 204 is movably positionable within the interior assembly 202. The bolt 204 includes a pair of projections 248*a*, 248*b*, a pair of handing apertures 251*a*, 251*b*, and a pair of stop recesses 250*a*, 250*b*. The bolt 204 is configured in a way to be positioned within the housing in a reversible fashion without needing to be removed from the interior assembly 202.

The pair of projections 248*a*, 248*b* limit the movement of the bolt 204 with respect to the interior assembly 202. The pair of projections 248*a*, 248*b* are configured to contact the interior assembly 202, specifically the housing cover 212, when the bolt 204 moves between the extended position and the retracted position. The projections 248*a*, 248*b* prevent the bolt 204 from moving past the retracted position and past the extended position.

The handing apertures 251*a*, 251*b* are each configured to receive a fastener 219 (shown in FIG. 15) to secure the bolt 204 to one of the biasing blocks 240*a*, 240*b*. In some examples, depending on the handing of the gate latch 200, the fastener 219 is secured to just one biasing block 240*a*, 240*b*.

The stop recesses 250*a*, 250*b* of the bolt 204 are configured to interface with the bolt retention assembly 232, specifically the retention pins 215*a*, 215*b*. The retention pins 215*a*, 215*b* are configured to be positioned within the stop recesses 250*a*, 250*b* when the bolt 204 is in the extended position, thereby retaining the bolt 204 in the extended position. In some examples, the retention pin 215*a* is configured to be selectively positioned within the stop recess 250*a* when the gate latch 200 is configured in a first handing configuration, and the retention pin 215*b* is configured to be selectively positioned within the stop recess 250*b* when the gate latch 200 is configured in a second handing configuration.

Figure 14:
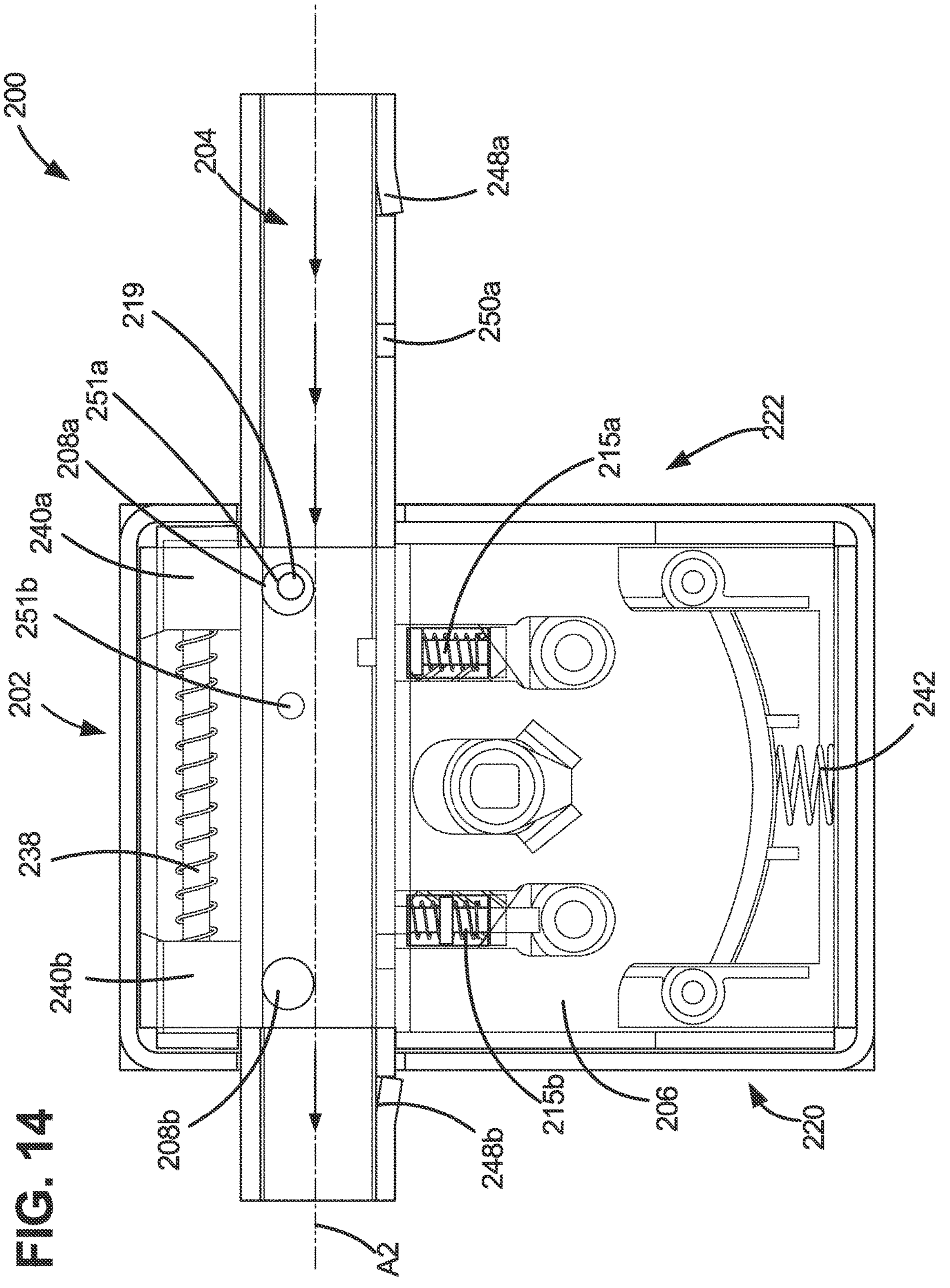
FIG. 14 is a rear view of the gate latch of FIG. 10 with the bolt in a retracted position.
Figure 15:
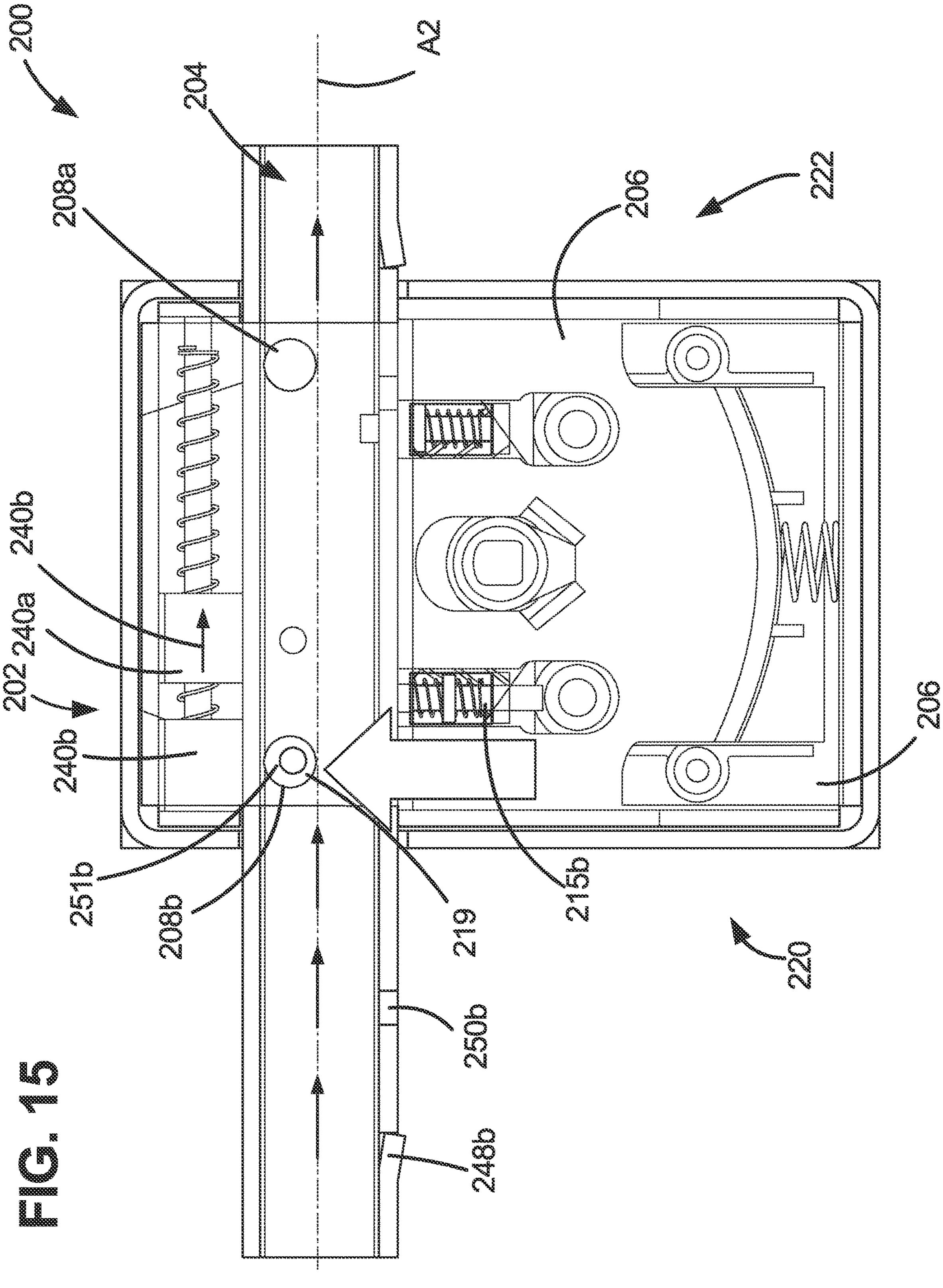
FIG. 15 is a rear view of the gate latch of FIG. 10 with the bolt in an extended position.

FIGS. 14 and 15 show rear views of the gate latch 200 in the first and second handing configurations, respectively.

As shown in FIG. 14, to hand the gate latch 200 in the first handing configuration, a user positions a fastener 219 (e.g., a bolt, screw, pin, or like fastener) through a first handing housing aperture 208*a* in the rear housing 206. Once through the aperture 208*a*, the fastener 219 is positioned within the handing aperture 251*a* defined by the bolt 204, and into the first biasing block 240*a* of the bolt assembly 230, thus the fastener 219 connects the bolt 204 to the first biasing block 240*a* via the handing aperture 251*a*. As indicated by movement arrows on the bolt 204 in FIG. 14, by connecting the bolt 204 to the first biasing block 240*a*, the bolt 204 can only move toward the first side 220 of the gate latch 200. Similar to gate latch 100 described above, the bolt 204 is biased toward the retracted position via the biasing spring 238 positioned between the two biasing blocks 240*a*, 240*b*. As depicted in FIG. 14, the bolt 204 is in the retracted position. When in the first handing configuration, as the bolt 204 moves toward the first side 220 of the gate latch 200 from the retracted position to the extended position, biasing block 240*a* moves with the bolt 204, thereby compressing the bolt biasing spring 238.

As shown in FIG. 15, to hand the gate latch 200 in the second handing configuration, a user positions the fastener 219 through a second handing housing aperture 208*b* in the rear housing 206. Once through the aperture 208*b*, the fastener 219 is positioned within the handing aperture 251*b* in the bolt 204 and into the second biasing block 240*b* of the bolt assembly 230, thus connecting the bolt 204 to the second biasing block 240*b* via the handing aperture 251*b*. Thus in the second handing configuration, the bolt 204 is configured to travel toward the second side 222 to the extended position.

Because the bolt 204 is configured to be biased toward the retracted position, the user selects the first or second handing configuration when the bolt 204 is in the retracted position. In some examples, due to the position of the handing apertures 251*a*, 251*b* on the bolt 204, the handing apertures 251*a*, 251*b* cannot both be aligned with the handing apertures 208*a*, 208*b* at the same time. This prevents the user from accidently placing a fastener 219 in each handing aperture 251*a*, 251*b* of the bolt 204 at the same time, thereby seizing the movement of the bolt 204.

To change between handing configurations, the fastener 219 is removed from the handing aperture 251*a*, 251*b* it is positioned within, the bolt 204 is manually slid to the desired retracted position, and the fastener 219 is re-secured within the opposite handing aperture 251*a*, 251*b*, thereby fixing the bolt 204 to the corresponding biasing block 240*a*, 240*b*. When the fastener 219 is first removed, the bolt 204 becomes unattached and disengaged from both biasing blocks 240*a*, 240*b*, allowing the bolt 204 to freely move along the bolt axis A2 without having to overcome any force from the bolt biasing spring 238.

Figure 16:
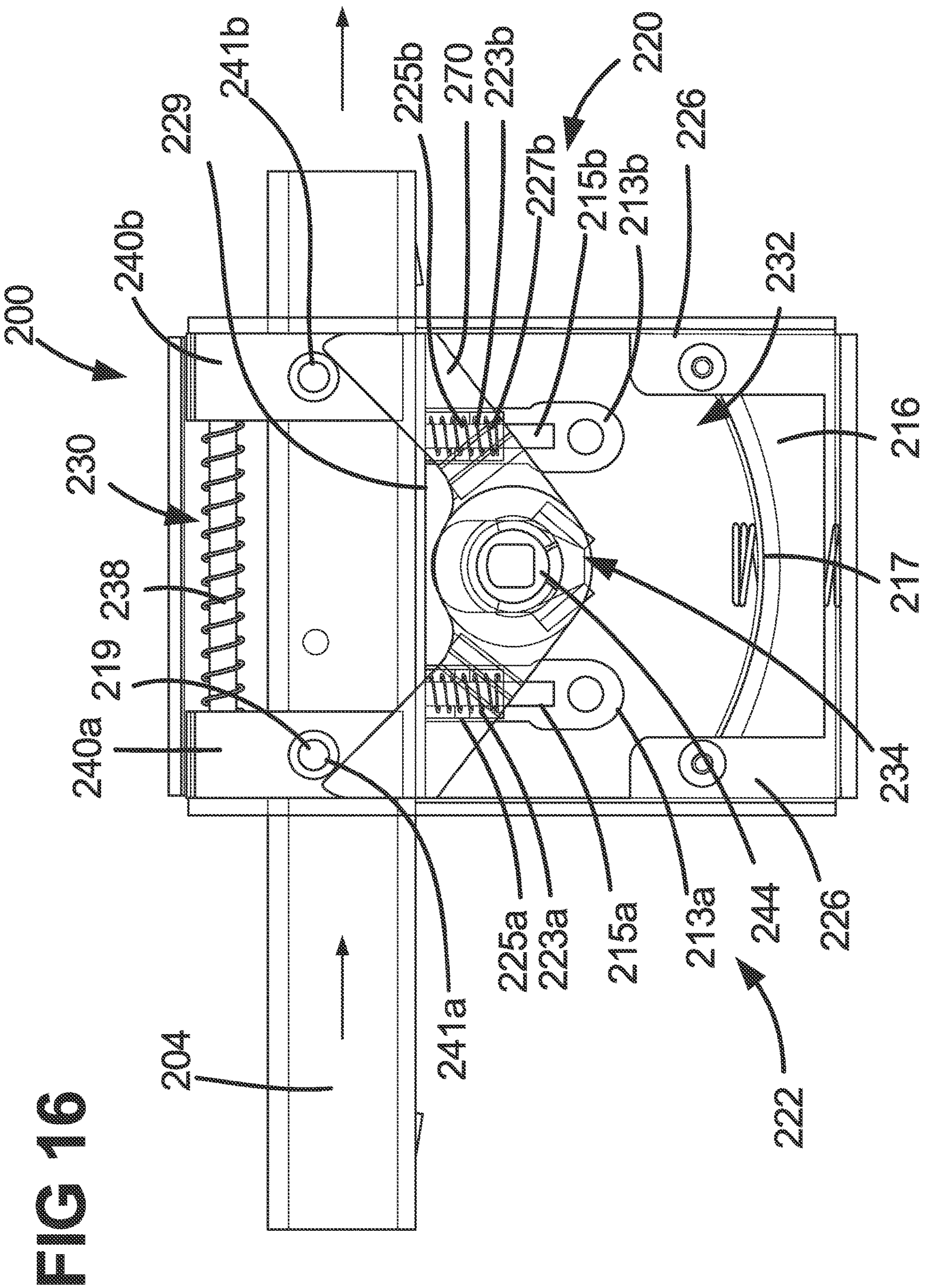
FIG. 16 is a front view of the gate latch of FIG. 10 with the bolt in the retracted position.
Figure 17:
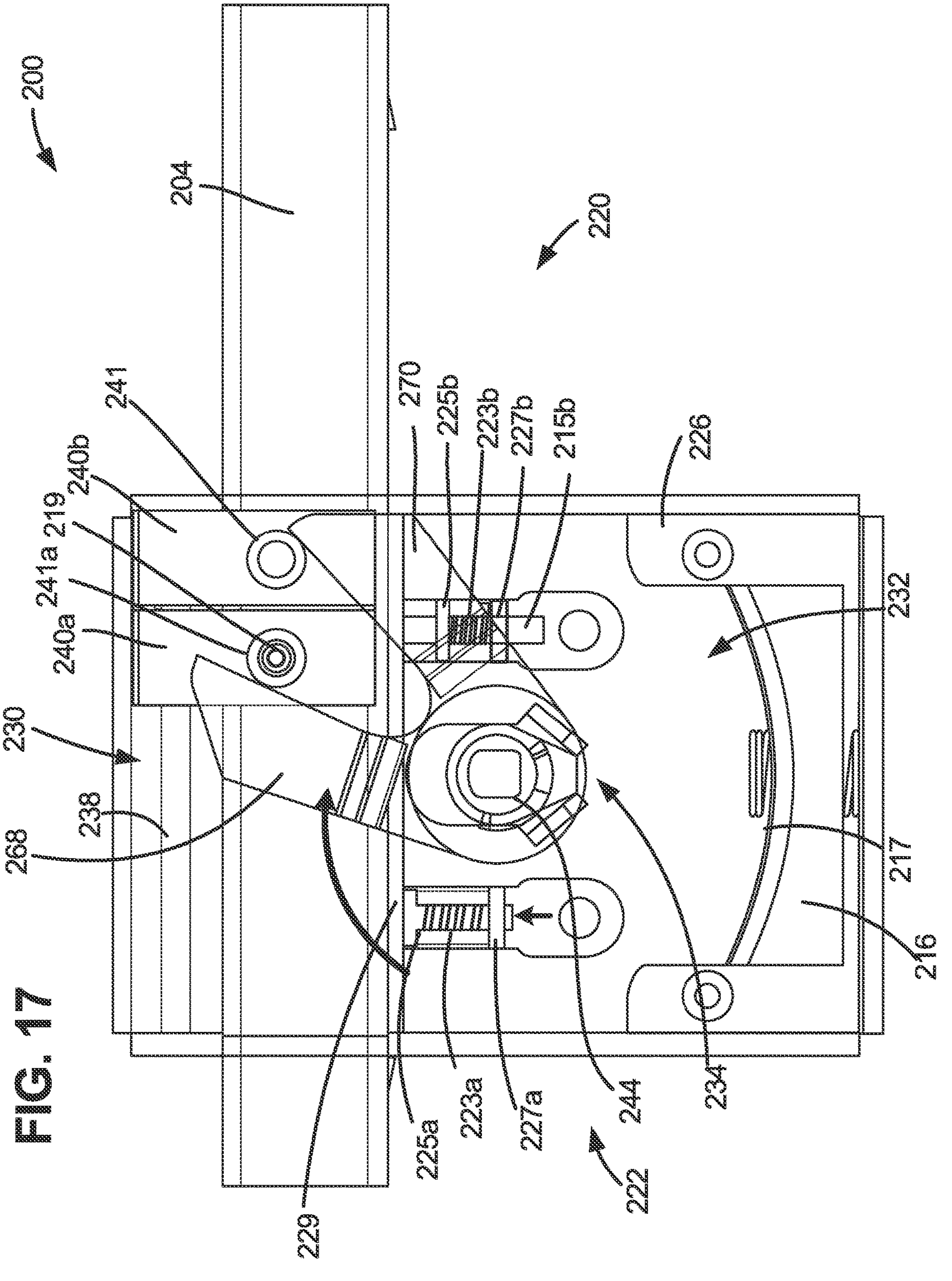
FIG. 17 is a front view of the gate latch of FIG. 10 with the bolt in the extended position.

FIG. 16 shows a front view of the gate latch 200 with the bolt 204 in the first handing configuration and in the retracted position so that when extended, the bolt 204 extends from the first side 220 of the gate latch 200. FIG. 17 shows a front view of the gate latch 200 with the bolt 204 in the first handing configuration and in the extended position.

The bolt assembly 230 is configured to cooperate with the bolt movement assembly 234 and the bolt retention assembly 232. As depicted, in the retracted position, the biasing blocks 240*a*, 240*b* are spaced at a maximum distance apart and, therefore, the bolt biasing spring 238 cannot force (or bias) the movement of the biasing blocks 240*a*, 240*b* any further. In some examples, the bolt biasing spring 238 is positioned around a guide shaft 239. In some examples, the biasing blocks 240*a*, 240*b* are configured to slide over the length of the guide shaft 239 as the bolt 204 moves between the retracted and extended positions in both the first and second handing configurations. In other examples, the bolt biasing spring 238 and biasing block 240*a*, 240*b* can be configured to bias the bolt 204 toward the extended position.

The biasing blocks 240*a*, 240*b* each include a bolt interfacing projection 241*a*, 241*b*. The bolt interfacing projections 241*a*, 241*b* are configured to receive a force from the first lever arm 268 or the second lever arm 270 to move the bolt from the retracted position to the extended position. Specifically, the bolt interfacing projection 241*a* of the biasing block 240*a* is configured to receive a force in a direction toward the first side 220 from the first arm lever 268, and the bolt interfacing projection 241*b* of the biasing block 240*b* is configured to receive a force in a direction toward the second side 222 from the second lever arm 270.

The bolt retention assembly 232 is configured to retain the bolt 204 in the extended position. In some examples, the bolt retention assembly 232 does not retain the bolt 204 in the retracted position. The trigger body 216 includes a pair of pin apertures 221*a*, 221*b*, each being positioned around the retention pin 215*a*, 215*b*, respectively.

The retention pins 215*a*, 215*b* are configured to retain the bolt 204 in the extended position. In some examples, the gate latch 200 includes a single retention pin. In other examples, the gate latch 200 can include more than two retention pins. The retention pins can be a variety of different shapes and sizes.

The retention pins 215*a*, 215*b* are each configured to be spring loaded via a pin spring 223*a*, 223*b*. Each pin spring 223*a*, 223*b* is positioned around a portion of the each pin 215*a*, 215*b* and captured between a pin flange 225*a*, 225*b* and a main housing flange 227*a*, 227*b*. The main housing flanges 227*a*, 227 extend from the main housing 226 and are positioned within the pin apertures 221*a*, 221*b* of the trigger body 216. The retention pins 215*a*, 215*b* are configured to be movable longitudinally and biased upward toward the bolt 204. The pins 215*a*, 215*b* position themselves within the stop recesses 250*a*, 250*b* of the bolt 204 when the bolt 204 is in the extended position and the stop recesses 250*a*, 250*b* are aligned with the pin 215*a*, 215*b*. In some examples, only a single stop recess 250*a*, 250*b* will align with a corresponding pin 215*a*, 215*b* when the bolt 204 is in the extended position. Further, in some examples, when in the retracted position, the stop recess 250*a*, 250*b* do not align with the pins 215*a*, 215*b* and, therefore, the pins 215*a*, 215*b* contact the bolt 204 but do not retain the bolt 204 in a particular position.

As shown in FIG. 17, the retaining pin 215*a* is extended and positioned within the stop recess 250*a* of the bolt 204 to retain the bolt 204 in the extended position when in the first handing configuration. Further, as shown in FIG. 17, retaining pin 215*b* stays in a lower position in comparison to retaining pin 215*a*, because retaining pin 215*b* is not positioned within stop recess 250*b* of the bolt 204.

The bolt movement assembly 234 is configured to move the bolt 204 from the retracted position to the extended position. Specifically, the spindle 244 is rotatable by way of a lock cylinder, handle, or other like attachment at the outside of the gate. As shown in FIG. 17, upon rotation of the spindle 244 when the bolt 204 is in the retracted position, at least one of the lever arms 268, 270 will rotate, thereby contacting at least one of the biasing blocks 240*a*, 240*b*, compressing the bolt biasing spring 238 by moving the at least one biasing block 240*a*, 240*b*, and positioning the bolt 204 in the extended position.

Figure 18:
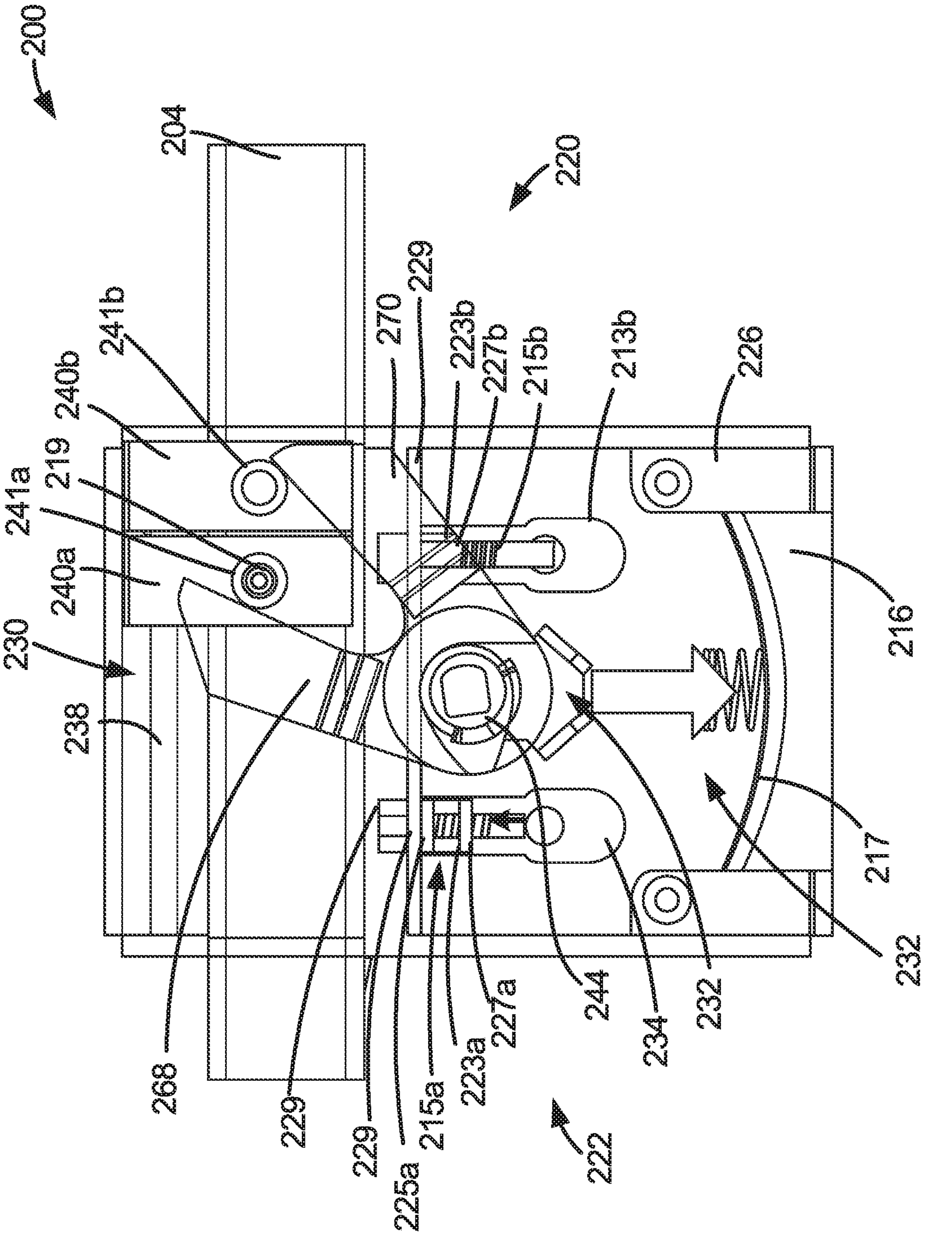
FIG. 18 is another front view of the gate latch of FIG. 10 with the bolt in the extended position.

FIG. 18 shows moving the bolt retention assembly 232 to move the bolt from the extended position to the retracted position. To lower the pins 215*a*, 215*b* to allow the bolt 204 to automatically return to the retracted position, the trigger body 216 is configured to have a flange 229 that contacts the pin flanges 225*a*, 225*b* at a side opposite the pin springs 223*a*, 223*b*. When the trigger body 216 is moved in a direction away from the bolt 204, as indicated by an arrow in FIG. 18, the flange 229 contacts the pin flanges 225*a*, 225*b* and moves the pins 215*a*, 215*b* away from the bolt 204, thereby compressing the pin springs 223*a*, 223*b*. Because the bolt 204 is spring biased toward the retracted position, the bolt 204 automatically moves to the retracted position. Movement of the trigger body 216 away from the bolt 204 can be facilitated by either a downward force received at the lip 217 (i.e., a force from a hand of a user), or via rotation of the spindle 244, as will be described in more detail with respect the FIGS. 22-25.

Figure 19:
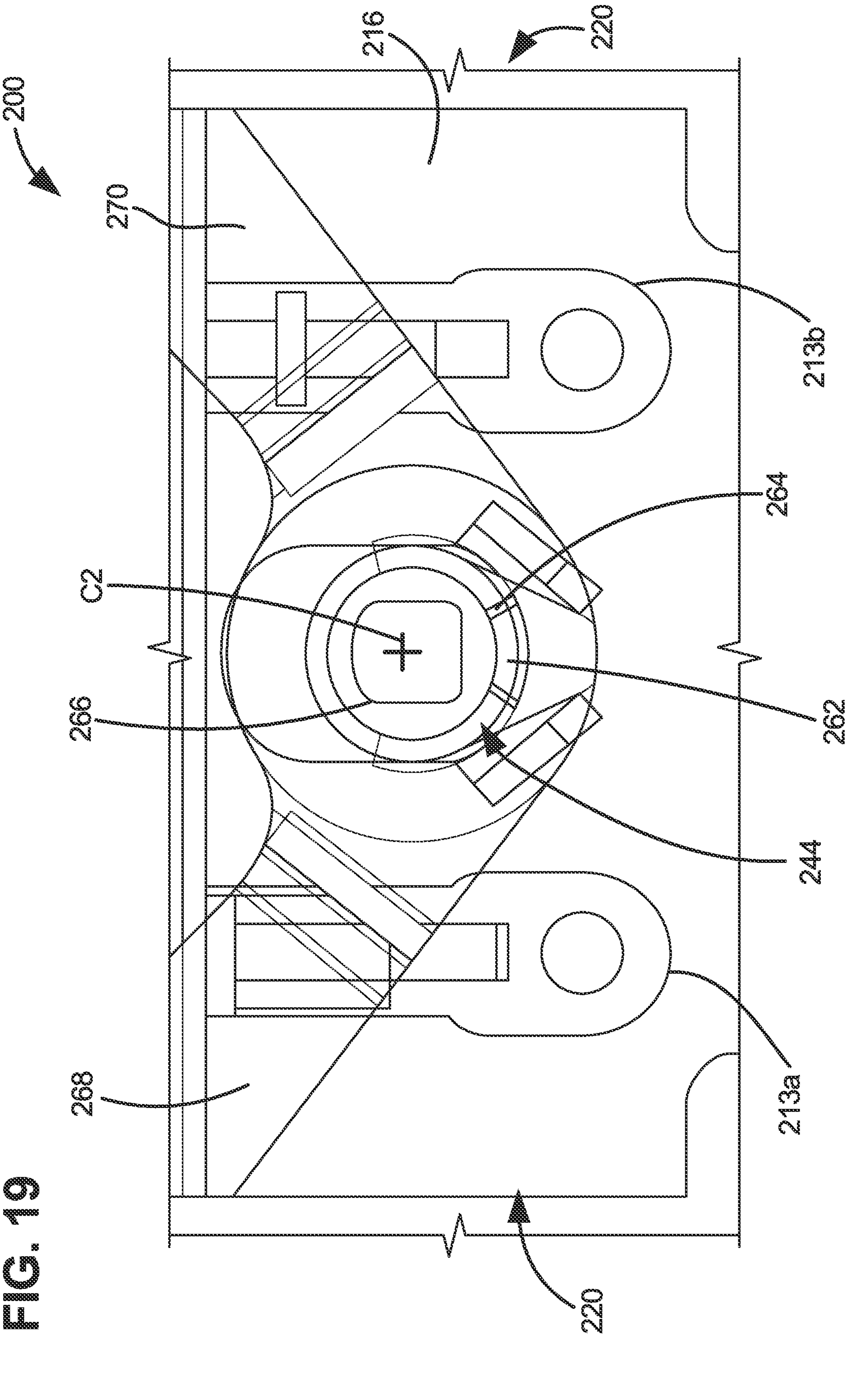
FIG. 19 is a front view of the bolt retention assembly of the gate latch of FIG. 10.

FIG. 19 shows a close up front view of the trigger body 216, spindle 244, first lever arm 268, and second lever arm 270. The spindle 244 is positioned within an elongated slot 260 of the trigger body 216. The slot 260 is sized so that the trigger body can move around the spindle 244 as the spindle moves along the length of the slot 260.

The spindle 244 is rotatable around axis C2. In some examples, the spindle 244 includes a cylindrical main body 266, and a first and a second lever arm projection 262, 264. The lever arm projections 262, 264 are fixed to the main body 266 and therefore rotate around the central axis C2 as the spindle 244 is rotated. The first lever arm projection 262 is positioned within a first lever arm slot 272 defined by the first lever arm 268, and the second lever arm projection 262 lever is positioned within a second lever arm slot 274 defined by the second lever arm 270.

Figure 20:
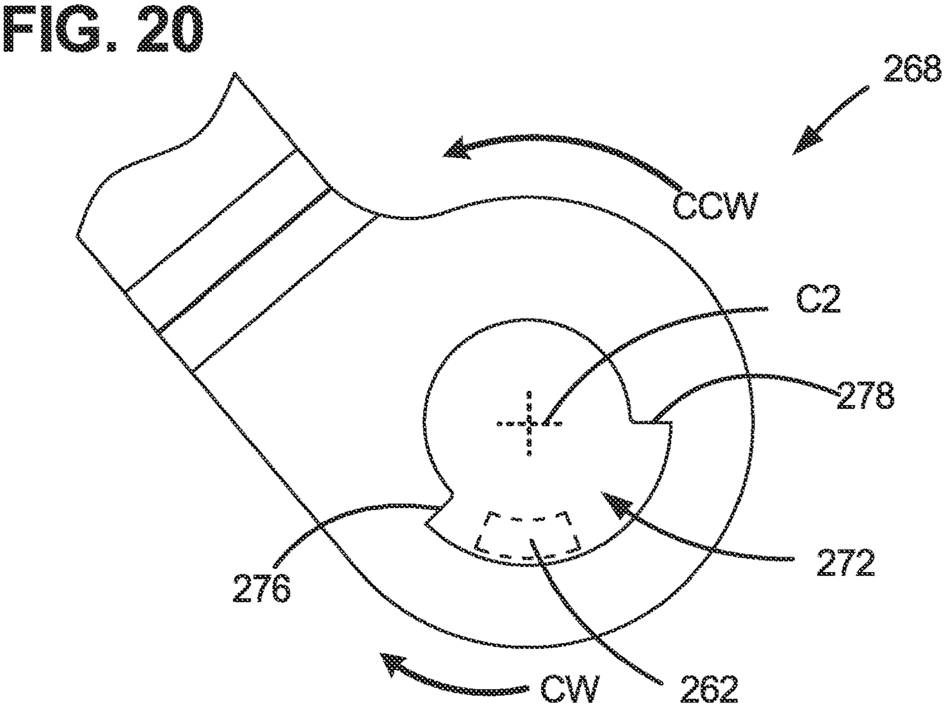
FIG. 20 is a front schematic view of a first lever arm of the gate latch of FIG. 10.
Figure 21:
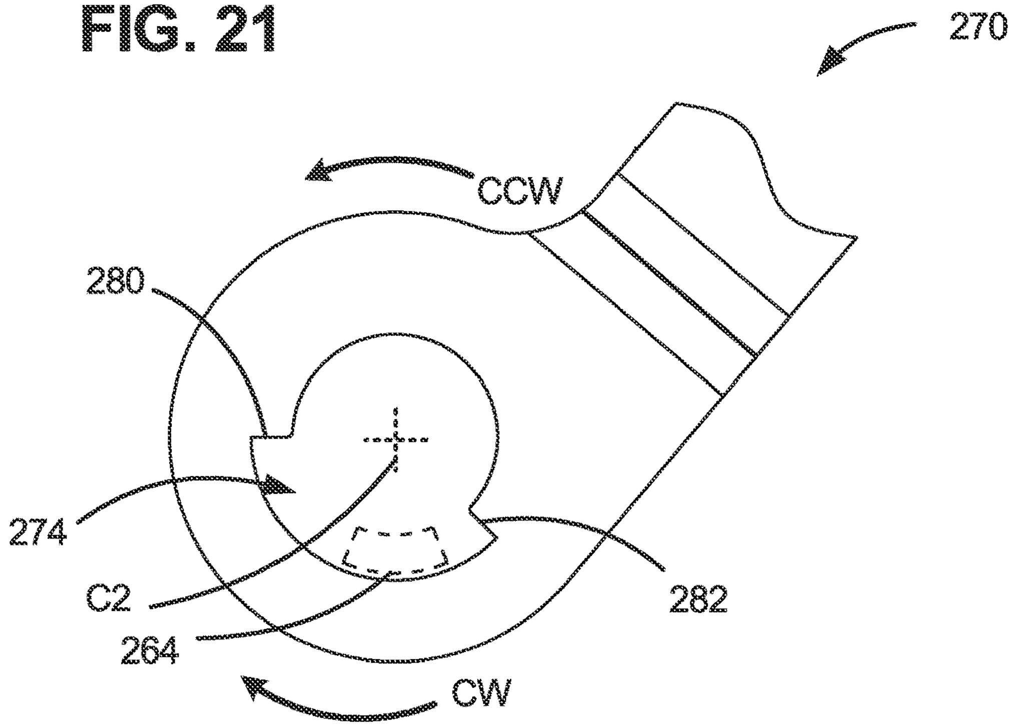
FIG. 21 is a front schematic view of a second lever arm of the gate latch of FIG. 10.

FIGS. 20 and 21 show each lever arm 268 and 270. The lever arm projections 262, 264 are also schematically shown in each of the first and second lever arm slots 272, 274. The first and second lever arm slots 272, 274 are each sized larger than the respective first and a second lever arm projections 262, 264. This allows each lever arm projection 262, 264 the freedom to move within each lever arm slot 272, 274 as the spindle 244 is rotated about the central axis C2, without always transferring the rotation of the spindle 244 to the first and second lever arms 268, 270.

With respect to the first lever arm 268, when the first lever arm projection 262 is rotated in a clockwise direction around the central axis C2, the first lever arm projection 262, in the depicted position, contacts a first end 276 of the first lever arm slot 272, thereby transferring motion from the first lever arm projection 262 to the first lever arm 268 causing the first lever arm 268 to rotate with the spindle 244. Conversely, when the first lever arm projection 262 is rotated in a counterclockwise direction around the central axis C2, in the depicted position, the first lever arm projection 262 moves within the slot 272 until the first lever arm projection 262 contacts a second end 278 of the first lever arm slot 272. While the first lever arm projection 262 moves within the first lever arm slot 272, no rotational motion is transferred from the first lever arm projection 262 until the first lever arm projection 262 contacts the second end 278.

The second lever arm 270 is configured to operate in an opposite fashion compared to the first lever arm 268. When the second lever arm projection 264 is rotated in a clockwise direction around the central axis C2, in the depicted position, the second lever arm projection 264 moves within the slot 274 until the second lever arm projection 264 contacts a first end 280 of the second lever arm slot 274. While the second lever arm projection 264 moves within the second lever arm slot 274, no rotational motion is transferred from the second lever arm projection 264 until the second lever arm projection 264 contacts the first end 280. Conversely, when the second lever arm projection 264 is rotated in a counterclockwise direction around the central axis C2, the second lever arm projection 264 contacts a second end 282 of the second lever arm slot 274, thereby transferring motion from the second lever arm projection 264 to the second lever arm 270 causing the second lever arm 270 to rotate with the spindle 244.

In some examples, when the bolt 204 is in the retracted position, the first and second lever arm projections 262, 264 are generally positioned in a 6 o'clock position on the spindle 244. However, depending on the positioning of the slots 272, 274, the projections 262, 264 can be positioned at a variety of locations on the spindle 244.

The first and second lever arm slots 272, 274 allow for the gate latch 200 to be handed in either the first or second handing configurations. Specifically, the first and second lever arms 268, 270 along with the biasing blocks 240*a*, 240*b* are configured to transfer rotation from the spindle 244 in either the clockwise or counterclockwise direction to move the bolt 204. For example, when in the first handing configuration, if the spindle 244 is rotated in the clockwise direction, the spindle 244 moves only the first lever arm 268 and not the second lever arm 270 thanks to the second lever arm slot 274. The first lever arm 268 contacts and moves the biasing block 240*a* (which is connected to the bolt 204 via the fastener 219), which moves the bolt 204 from the retracted to the extended position. Alternatively, in some examples, when in the first handing configuration, if the spindle 244 is rotated in a counterclockwise direction, the second lever arm 270 contacts the biasing block 240*b*, but the biasing block 240*b* does not move the bolt 204 because the biasing block 240*b* is not connected to the bolt 204.

Figure 22:
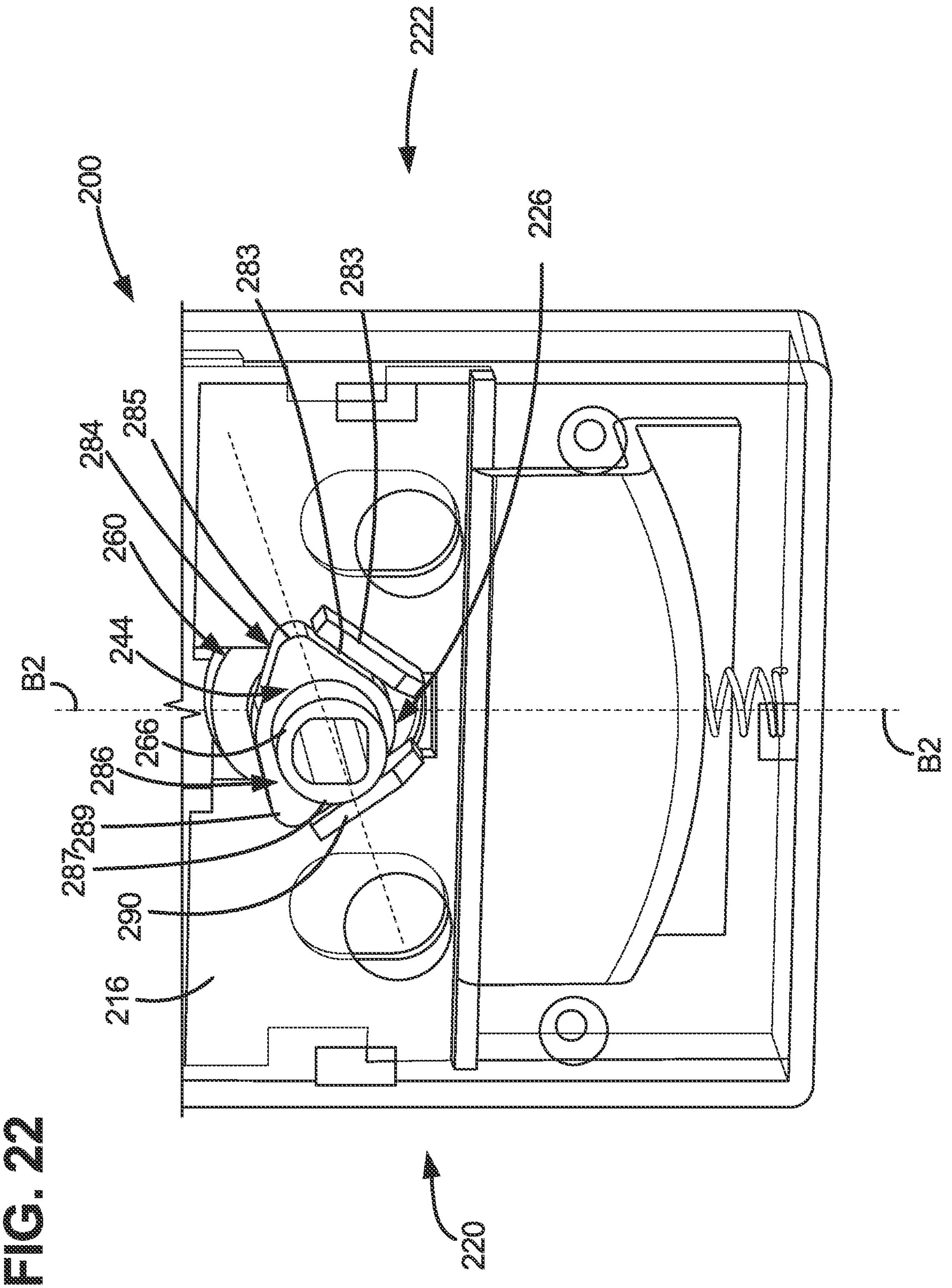
FIG. 22 is a rear perspective view of the gate latch of FIG. 10 with the bolt in a retracted position.

FIG. 22 shows a rear view of the spindle 244 positioned within a pocket 292 of the trigger body 216. Similar to the trigger body 116 and cam 146 described above, because the trigger body 216 controls the retention of the bolt 204 in the extended position, the spindle 244 and trigger body 216 are configured to translate rotational motion of the spindle 244 into axial movement of the trigger body 216 along the bolt retention axis B2. Specifically, rotation of the spindle 244 can cause the trigger body 216 to move in a direction away from the spindle 244 and bolt 204, thereby moving the retention pins 215*a*, 215*b* away from the bolt 204, releasing the bolt 204.

In some examples, the spindle 244 includes a first fin 284 and a second fin 286. The first fin 284 includes a side wall 283 and a point 285. The second fin 286 includes a side wall 287 and a point 289. The first fin 284 is configured to selectively contact a first tab 288 on the trigger body 216, and the second fin 286 is configured to selectively contact a second tab 290 on the trigger body 216. The first and second tabs 288, 290 of the trigger body 216 form the pocket 292. When the bolt 204 is in the retracted position (i.e., the gate latch 200 is unlocked), as shown in FIG. 22, the first and second fins 284, 286 are configured to seat within the pocket 292. In the depicted example, the pocket 292 has a generally triangular shape. Specifically, when the bolt 204 is in the retracted position, the first and second side walls 283, 287 of the first and second fins 284, 286 are generally parallel with the first and second tabs 288, 290.

Figure 23:
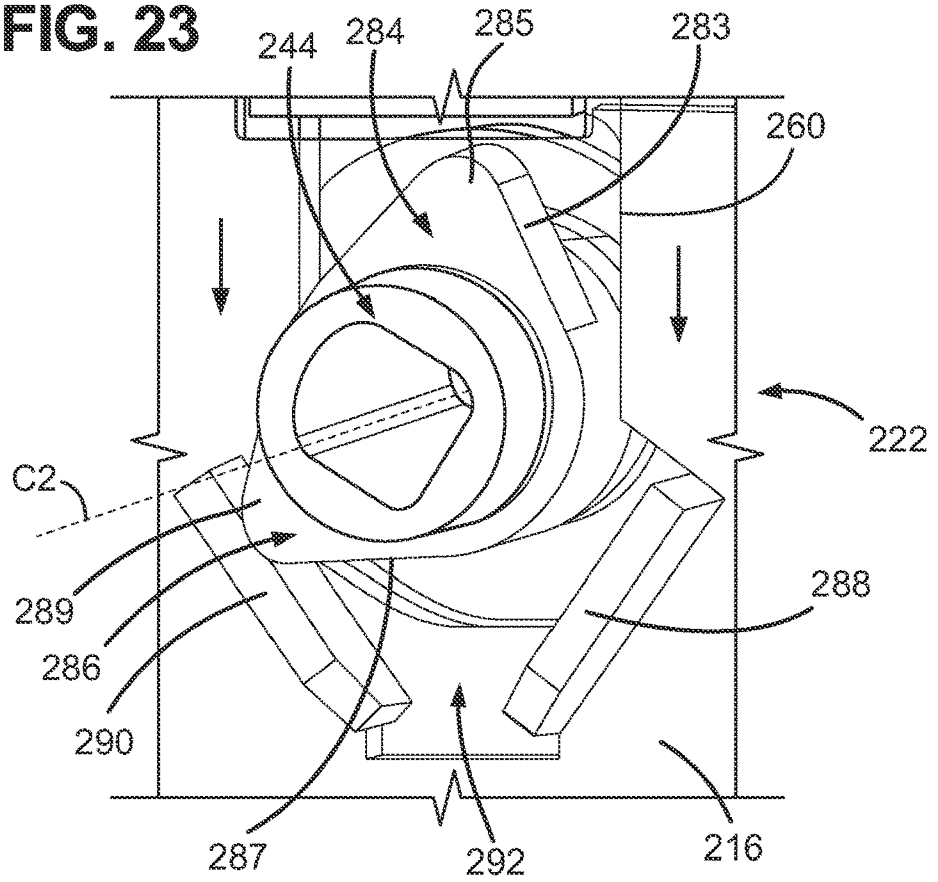
FIG. 23 is a rear perspective view of a spindle of the gate latch of FIG. 10 with the bolt between the retracted position and the extended position.
Figure 24:
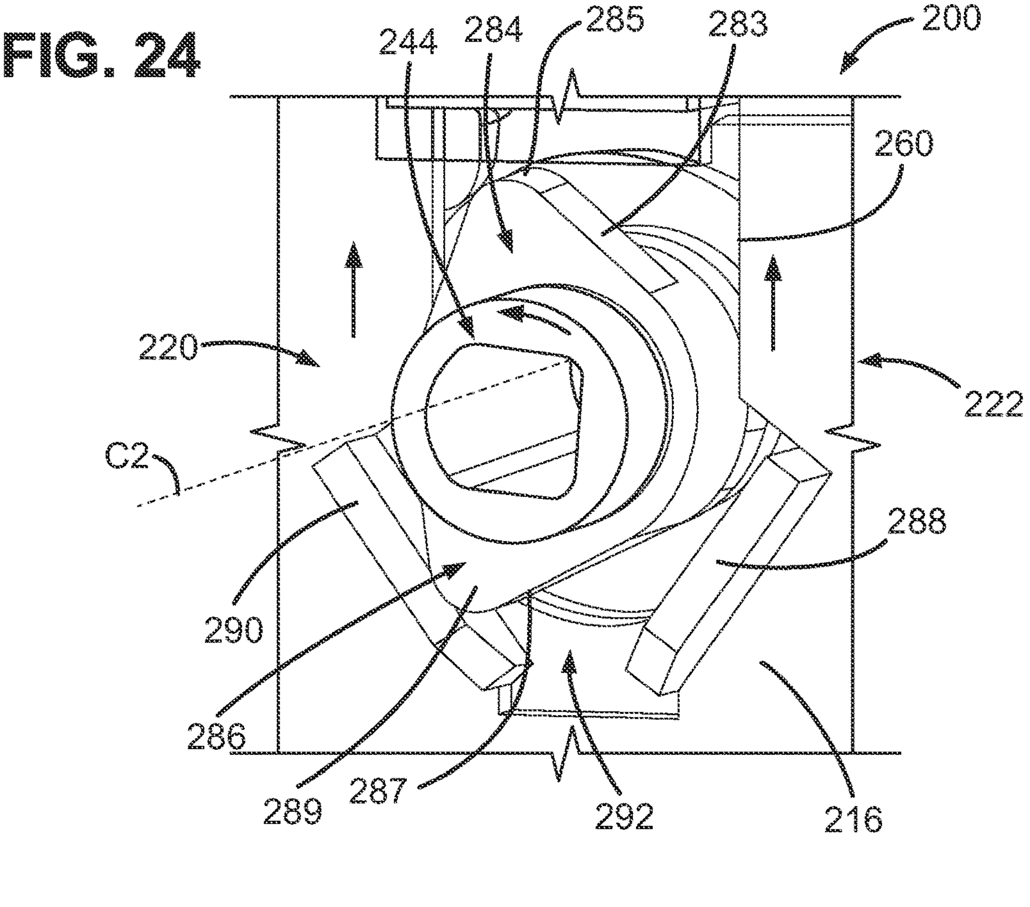
FIG. 24 is another rear perspective view of the spindle of the gate latch of FIG. 10 with the bolt between the retracted position and the extended position.
Figure 25:
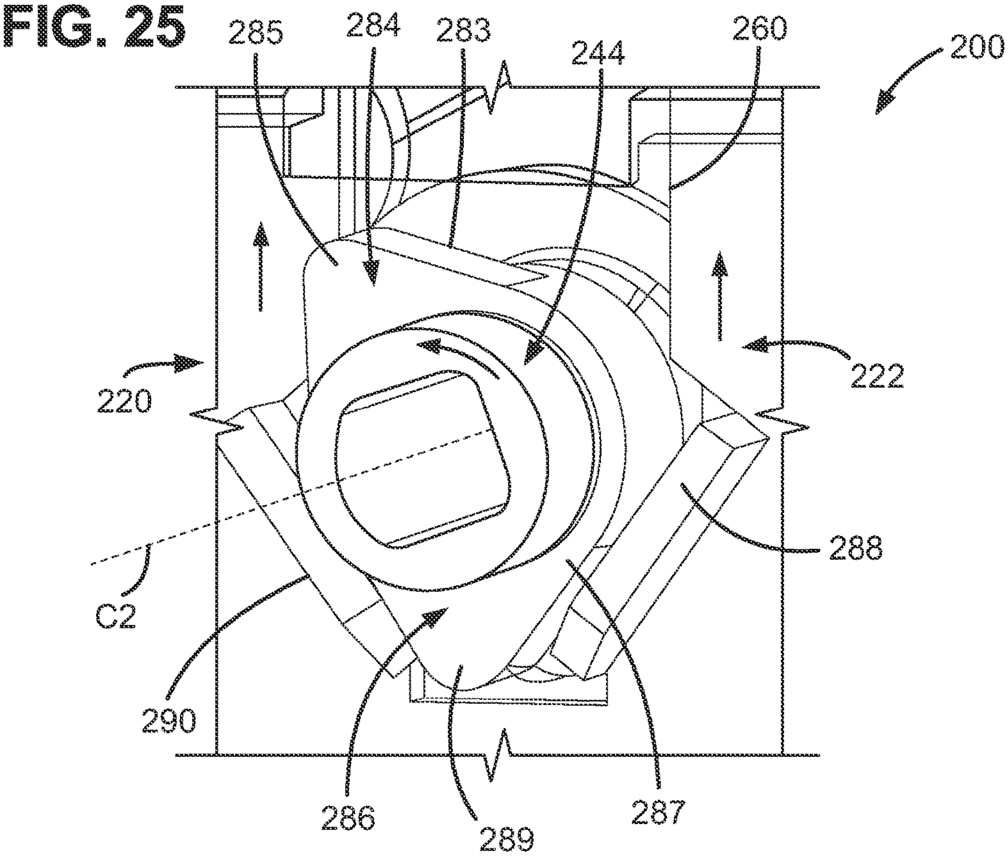
FIG. 25 is a rear perspective view of the spindle of the gate latch of FIG. 10 with the bolt in the extended position.

FIGS. 23-25 show the spindle 244 being rotated in a first direction; however, due to the symmetrical configuration of the spindle 244 and pocket 292, the spindle 244 and trigger body 216 operate in an identical manner when the spindle 244 is rotated in a second opposite direction. As shown in FIG. 23, the spindle 244 is partially removed from the pocket 292 formed by the tabs 288, 290. Further, the point 289 is shown contacting the tab 290. Because of the generally ramped surface of the tab 290, the spindle 244, via the point 289 of the second fin 286, exerts a downward force on the tab 290, thereby moving the pocket 292 away from the spindle 244, and thereby moving the trigger body 216 away from the bolt 204. Depending on the handing of the gate latch 200, this first rotation direction can be representative of moving the bolt 204 toward the extended position (i.e., locking). In the depicted example, due to the shape of the fins 284, 286 and tabs 288, 290, whenever the bolt 204 is moving, the trigger body 216 is always moved in a direction away from the bolt 204, causing the retention pins 215*a*, 215*b* to be moved away from the bolt 204.

As the spindle 244 is further rotated, as shown in FIG. 24, the trigger body 216 begins to move back toward the spindle 244 and bolt 204. Once rotated generally about 90 degrees, the spindle 244 is again positioned within the pocket 292, as shown in FIG. 25. Because the spindle 244 has been rotated, the side wall 287 of the second fin 286 is now in contact with the tab 288. By allowing the trigger body 216 to move back toward the bolt 204 when rotation is complete, the trigger body 216 allows the retention pins 215*a*, 215*b* to move toward the bolt 204 so as to be seated in at least one of the stop recesses 250*a*, 250*b* to retain the bolt 204 in the extended (i.e., locked) position. When moved back in the opposite direction after the spindle 244 has been rotated, the second fin 286, contacts and cams the tab 290 again, moving the trigger body 216 away from the spindle 244 and bolt 204 to allow the trigger body 216 to permit the bolt 204 to bias back toward the retracted position.

Figure 26:
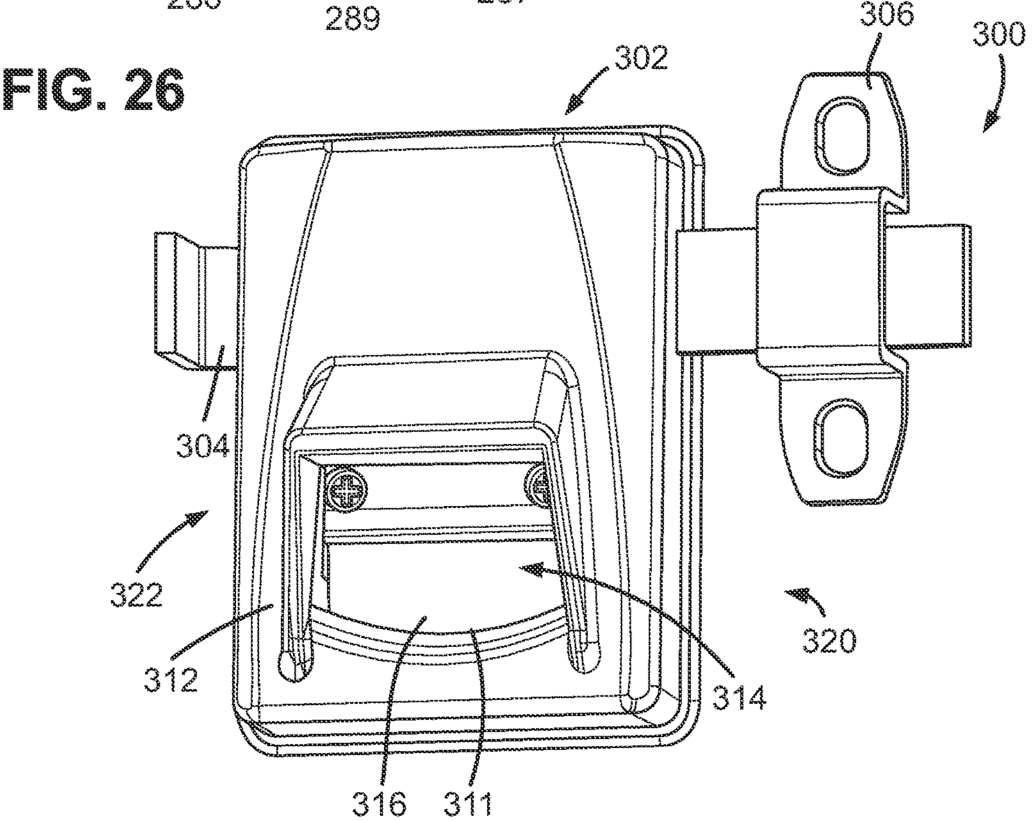
FIG. 26 is a front perspective view of a gate latch with a bolt in an extended position, according to one example of the present disclosure.

FIG. 26 shows a front view a gate latch 300, according to another embodiment of the present disclosure. The gate latch 300 is substantially similar to the gate latches 100, 200 described above. The gate latch 300 includes an interior assembly 302 and a bolt 304 movably mounted at least partially within the interior assembly 302. The interior assembly 302 and bolt 304 are similar to the interior assemblies 102, 202 and bolts 104, 204, described above.

Figure 27:
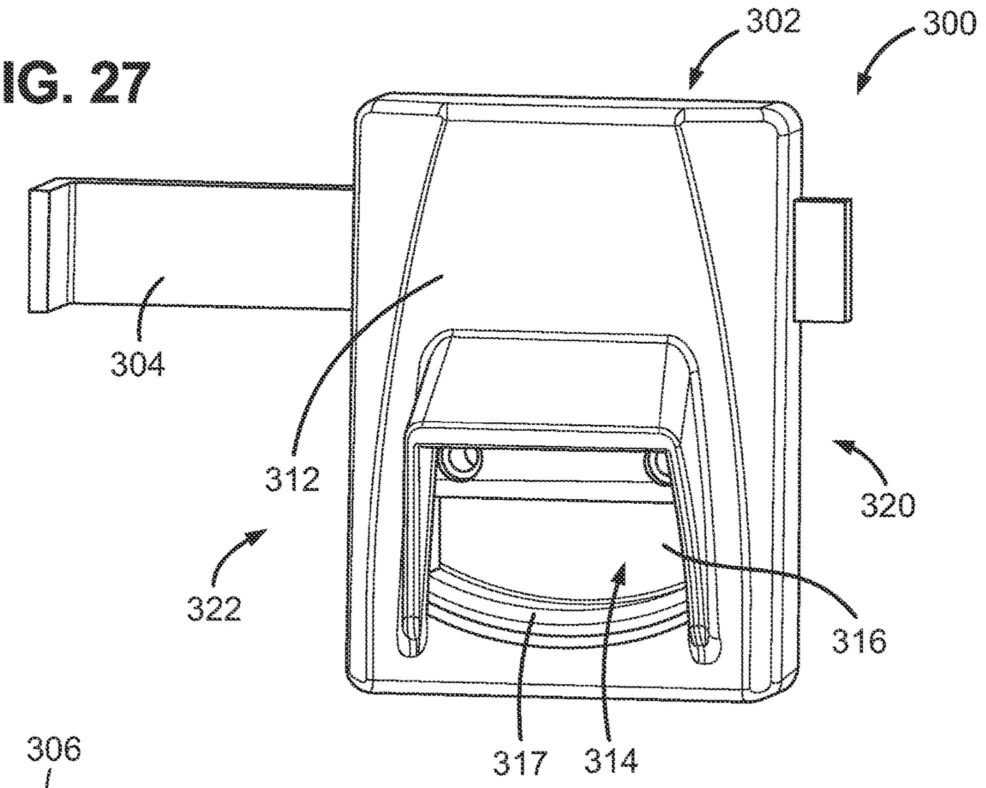
FIG. 27 is a front perspective view of the gate latch of FIG. 15 with the bolt in a retracted position.

The bolt 304 can extend to either a first side 320 or a second 322 of the interior assembly 302 to allow the user to change the handing of the gate latch 300 in the field. The bolt 304 can be received by a receiver 306 when extended from a side 320, 322 in a locked position, as shown in FIG. 26, and removed from the receiver 306 when retracted from a side 320, 322 in the unlocked position, as shown in FIG. 27.

Like the gate latches 100, 200 described above, the gate latch 300 can be operated by a trigger body 316 or a spindle 344 so that the user can quickly unlock or lock the gate latch 300 from the inside of the gate and further unlock or lock the gate latch 300 from the outside of the gate.

The gate latch 300 includes the trigger body 316 that is accessible through an aperture 314 in a housing cover 312. The trigger body 316 is configured to interact with the components in the interior assembly 302 in a similar manner as trigger bodies 116, 216 described above to unlock the gate latch 300 when a user exerts a downward force on a lip 317, thereby moving the bolt 304 from an extended position from a particular side 320, 322 of the gate latch 300 to a retracted position with respect the same side 320, 322. In some examples, the user can manually move the bolt 304 from the retracted position to the extended position, thereby allowing the user to lock the gate latch 300 from inside the gate.

Figure 28:
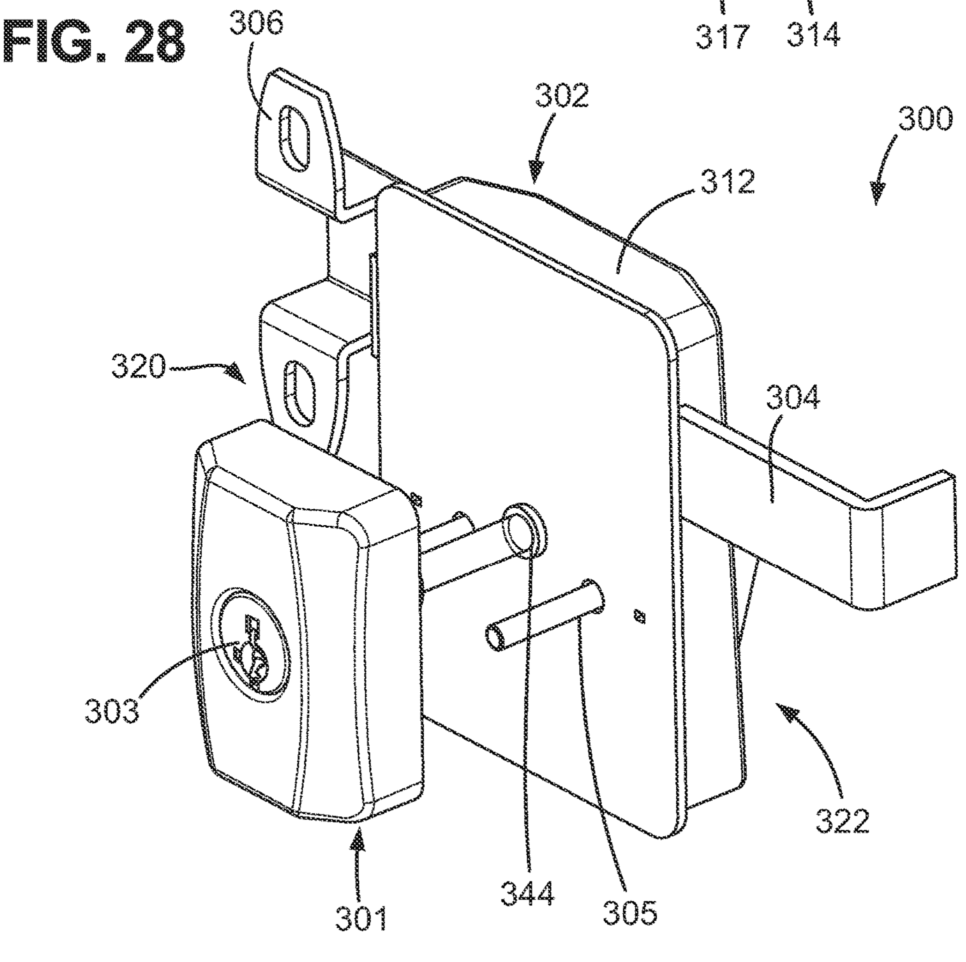
FIG. 28 is a rear perspective view of the gate latch of FIG. 15.

FIG. 28 shows a rear perspective view of the gate latch 300. As shown, the spindle 344 is mated with a lock housing 301 having a lock cylinder 303. The lock housing 301 is configured to be mounted at the outside of a gate, opposite the interior assembly 302. The lock cylinder 303 can be rotated using a valid key to cause rotation of the spindle 344, thereby cycling the gate latch 300 between the unlocked and locked positions. In some examples, the interior assembly 302 can be attached to a gate using at least one fastener 305.

Figure 29:
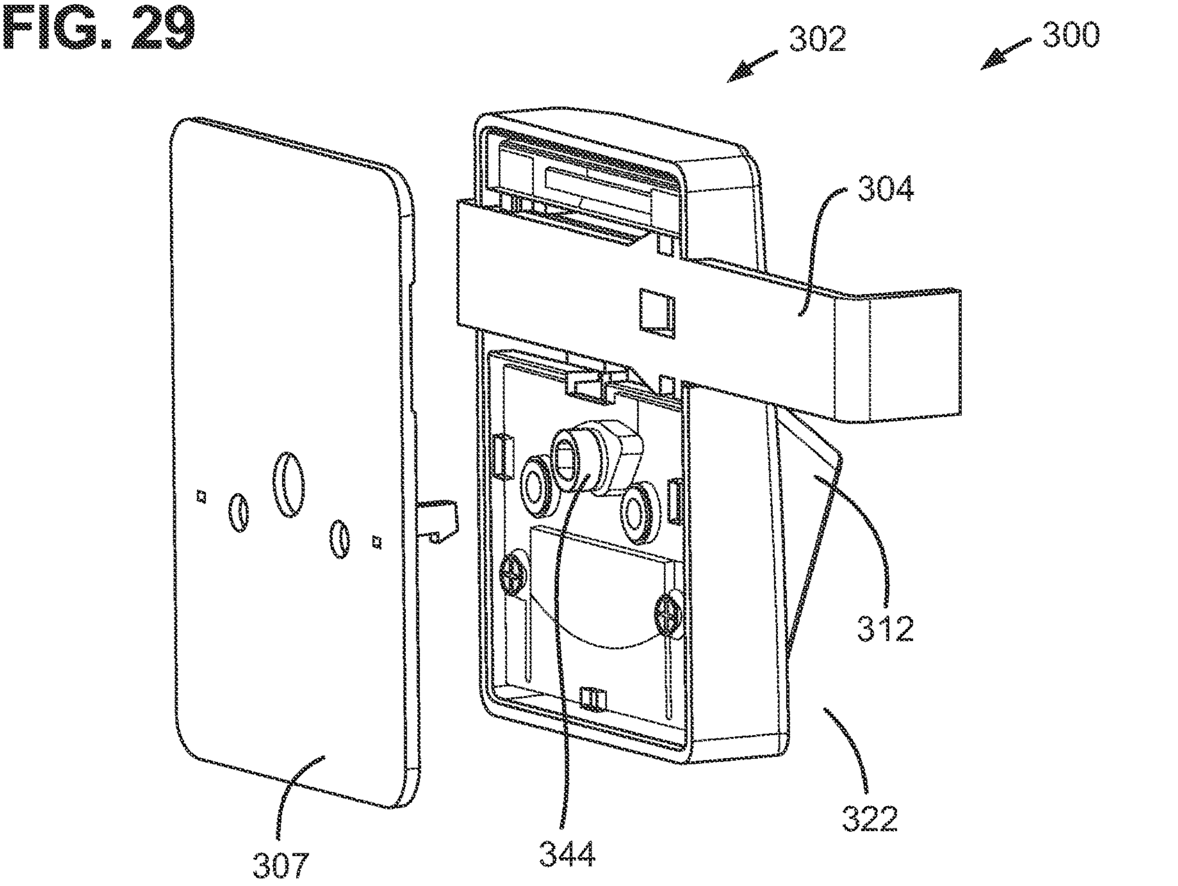
FIG. 29 is a rear perspective view of the gate latch of FIG. 15 with a back housing cover unattached.
Figure 30:
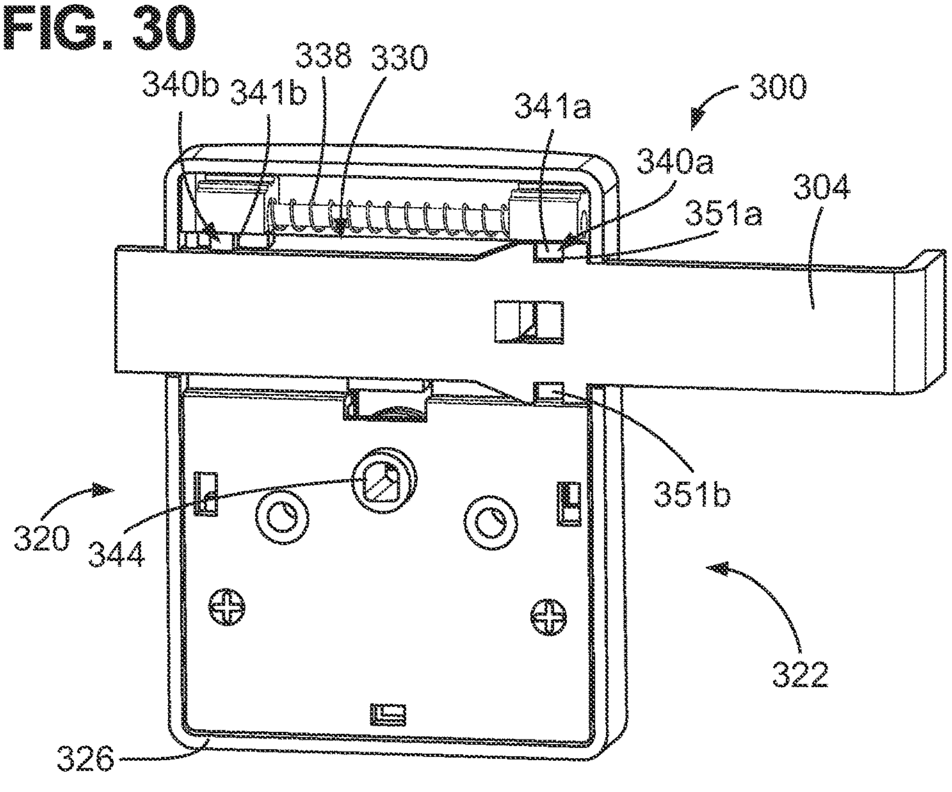
FIG. 30 is a rear perspective view of the gate latch of FIG. 15 with the bolt in a first handing configuration.

FIGS. 29-31 show perspective rear views of the gate latch 300 with a back housing cover 307 removed and a main housing 326 shown as transparent. FIG. 30 shows the bolt 304 in a first handing configuration, and FIG. 32 shows the bolt 304 in a second handing configuration. To change the handing of the bolt 304, the back housing cover 307 is removed from the main housing 326 and the bolt is removed from the interior assembly 302, flipped, and then reinserted within the interior assembly 302. Like the gate latches 100, 200 described above, the gate latch 300 includes a bolt assembly 330 that includes the bolt 304, a bolt biasing spring 338, and a pair of biasing blocks 340*a*, 340*b*. The biasing spring 338 is positioned between the biasing blocks 340*a*, 340*b*, and the biasing blocks 340*a* have projections 341*a*, 341*b* that are in selective communication with a recess 351*a*, 351*b* defined by the bolt 304. When in a particular handing configuration (i.e., the first or the second handing configuration), a single projection 341*a*, 341*b* of a biasing block 340*a*, 340*b* will be positioned within a single recess 351*a*, 351*b*. Therefore, as the bolt 304 moves between the retracted and extended positions, only a single biasing block 340*a*, 340*b* moves with it. The biasing spring 338 is positioned between the biasing blocks 340*a*, 340*b* and configured to bias the bolt 304 toward the retracted position.

Figure 33:
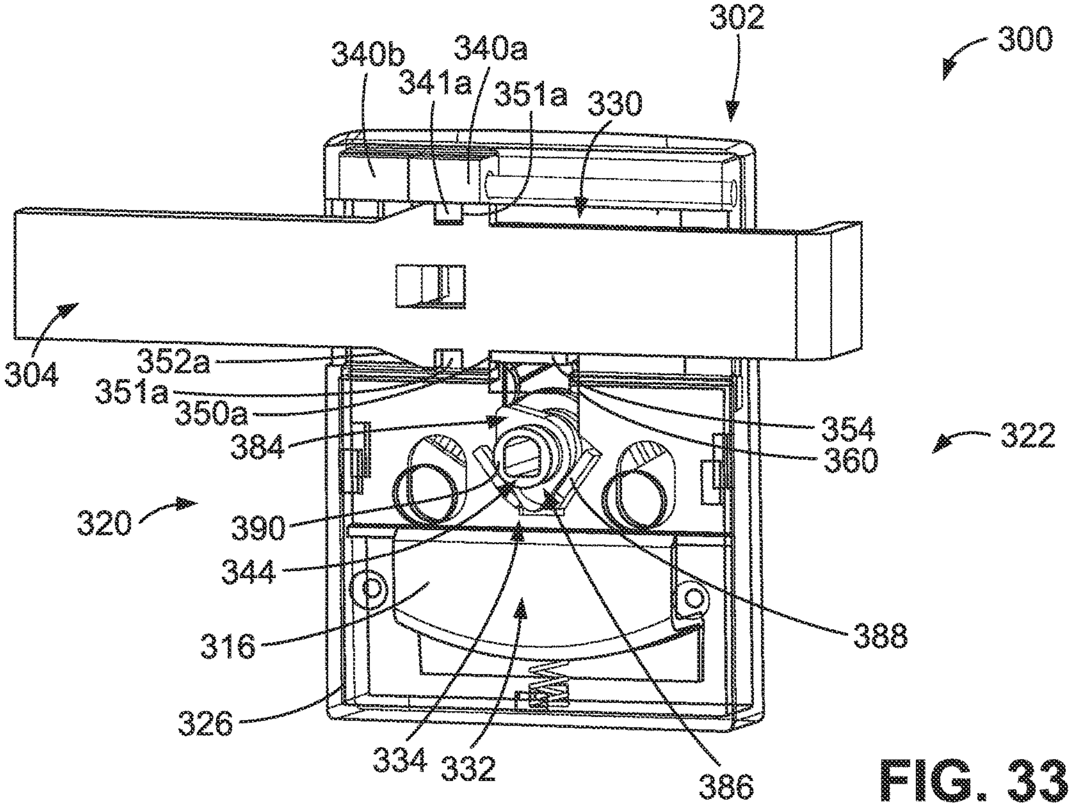
FIG. 33 is a rear perspective view of the gate latch of FIG. 15 with the bolt in the extended position and the back cover removed.

FIG. 32 shows a perspective rear view of the gate latch 300 with the bolt 304 in the retracted position, the back housing cover 307 removed, and the main housing 326 shown as transparent. FIG. 33 shows a perspective rear view of the gate latch 300 with the bolt 304 in the extended position, the back housing cover 307 removed, and the main housing 326 shown as transparent. Like gate latches 100, 200 described above, the gate latch 300 includes a bolt retention assembly 332 and a bolt movement assembly 334. The bolt retention assembly 332 includes the trigger body 316, a retention projection 354, and a trigger body biasing spring 342. The bolt movement assembly 334 includes the spindle 344, a first lever arm 368, and a second lever arm 370.

In general, the three assemblies 330, 332, 334 within the interior assembly 302 operate along different operational axes. The bolt assembly 330, specifically the bolt 304, moves longitudinally along a bolt axis A3. The bolt retention assembly 332 moves longitudinally, specifically the trigger body 316, along a bolt retention axis B3, while the bolt movement assembly 334 generally rotates around a central axis C3. The bolt axis A3 and the bolt retention axis B3 are generally transverse to one another. In some examples, the bolt axis A3 and the bolt retention axis B3 are generally perpendicular to one another.

The bolt retention assembly 332 operates in a substantially similar fashion to the bolt retention assemblies 132, 232, described above. Specifically, the trigger body 316 is spring biased toward the bolt 304, and the trigger body 316 includes the retention projection 354 that interfaces with a pair of stop surfaces 350*a*, 350*b* on the bolt 304 to retain the bolt 304 in the extended position, as shown in FIG. 33. Further, in some examples, the bolt 304 also includes a pair ramped surfaces 352*a*, 352*b* to urge the retention projection 354 away from the bolt 304 when the bolt 304 is moving from the retracted position to the extended position. The retention projection 354 is moved away from the bolt 304 when the lip 317 of the trigger body 316 is depressed or when the spindle 344 is rotated. Like gate latches 100, 200, the trigger body 316 can be separately operated from the spindle 244 to move the bolt 304 to the retracted position thanks to a slot 360 defined by the trigger body 316 that is sized larger than the spindle 344 to allow the trigger body 316 to move without moving or exerting a force on the spindle 344.

The spindle 344 includes a first fin 384 and a second fin 386. The fins 384, 386 interface with tabs 388 and 390 of the trigger body 316 to selectively move the trigger body away from the bolt 304 in a substantially similar fashion to the fins 284, 286 and tabs 288, 290, described above.

Figure 34:
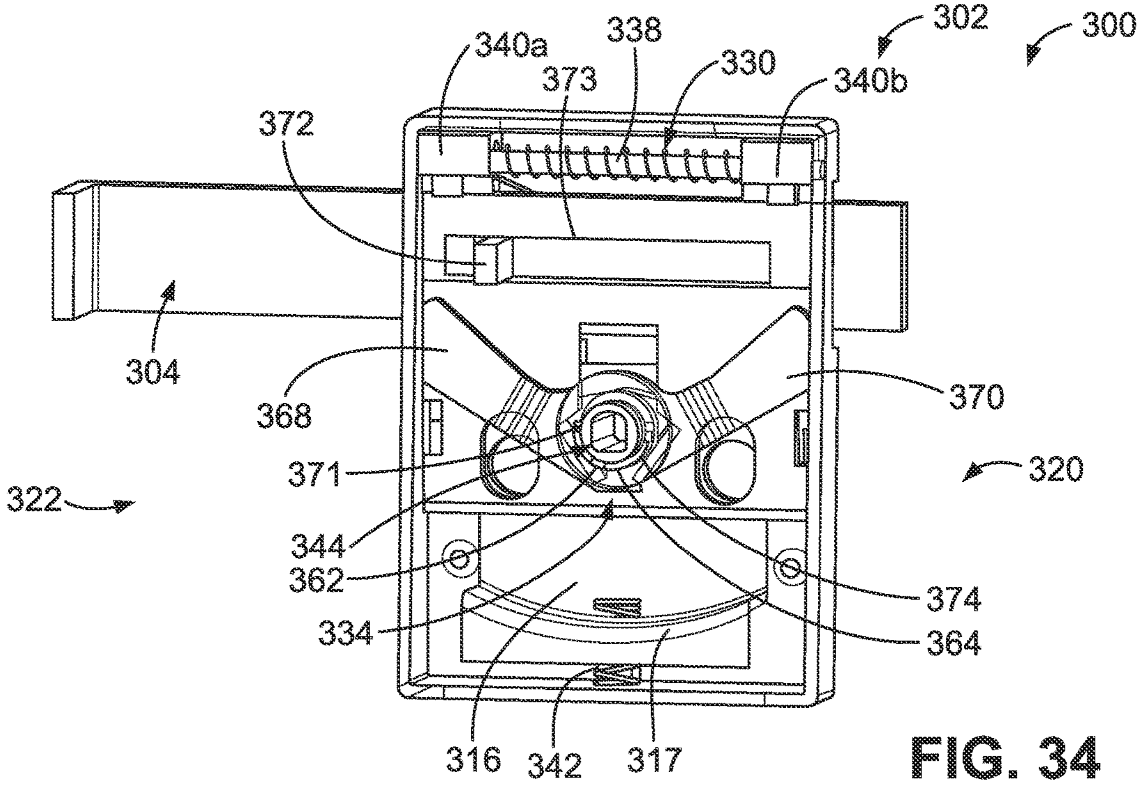
FIG. 34 is a front perspective view of the gate latch of FIG. 15 with the bolt in the retracted position and a housing cover removed.
Figure 35:
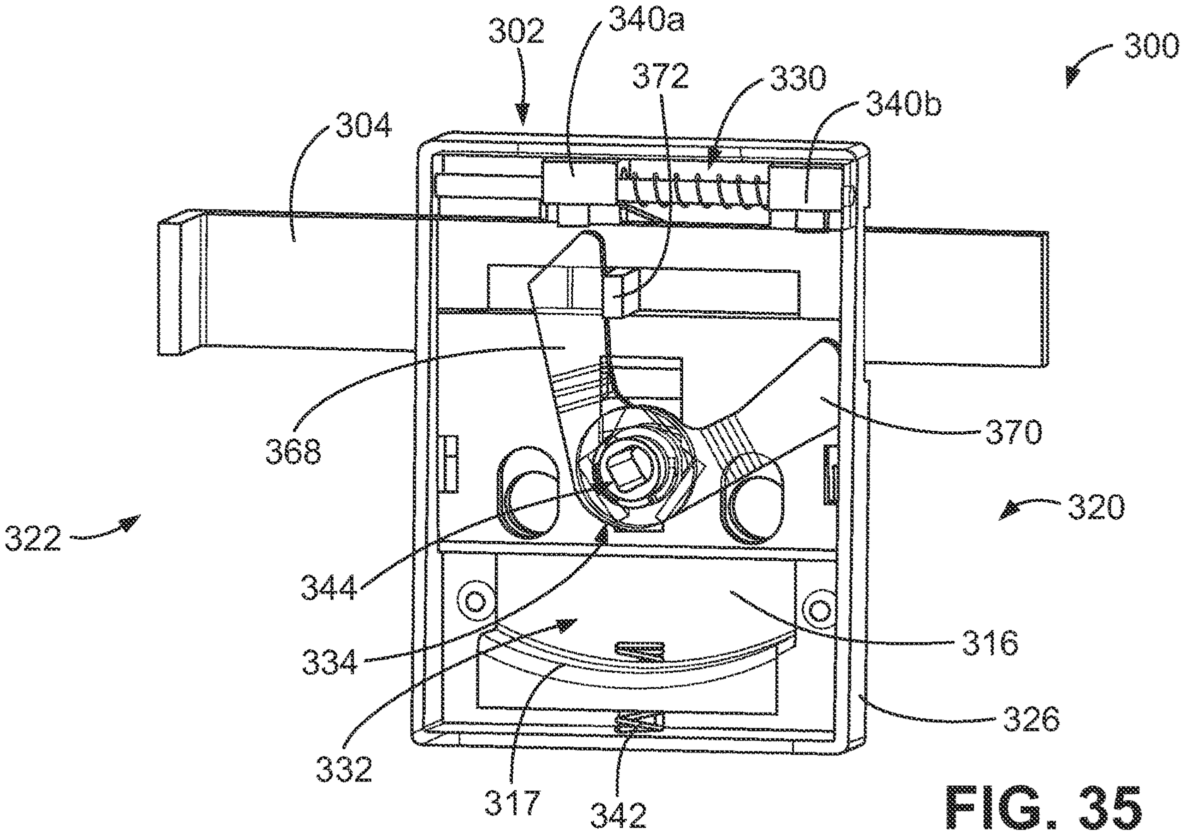
FIG. 35 is a front perspective view of the gate latch of FIG. 15 with the bolt in between the retracted position and the extended position and the housing cover removed.
Figure 36:
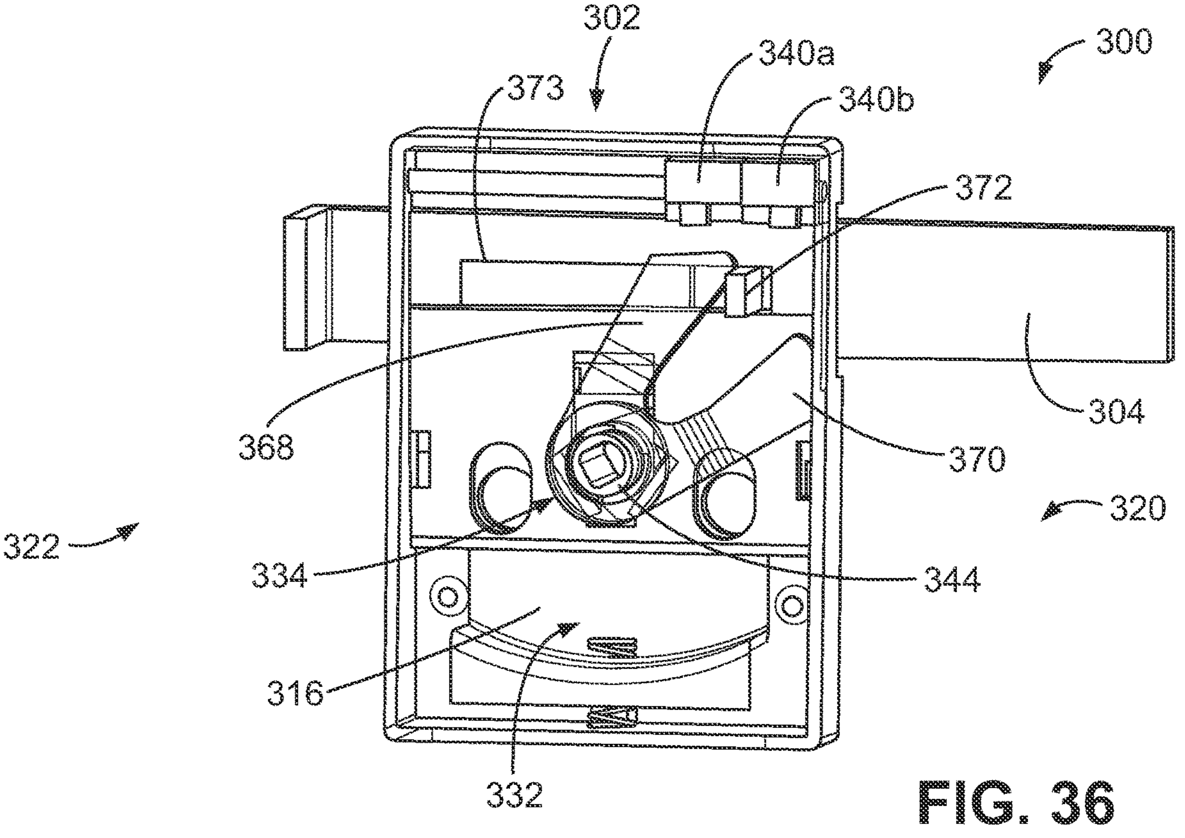
FIG. 36 is a front perspective view of the gate latch of FIG. 15 with the bolt in the extended position and the housing cover removed.

FIG. 34 shows a perspective front view of the gate latch 300 with the bolt 304 in the retracted position, the housing cover 312 removed, and the main housing 326 shown as transparent. FIG. 35 shows a perspective front view of the gate latch 300 with the bolt 304 positioned between the retracted position and the extended position, the housing cover 312 removed, and the main housing 326 shown as transparent. FIG. 36 shows a perspective front view of the gate latch 300 with the bolt 304 in the extended position, the housing cover 312 removed, and the main housing 326 shown as transparent.

As shown, the bolt movement assembly 334 is substantially similar to the bolt movement assembly 234 described above. Specifically, the first and second lever arms 368, 370 are configured to selectively move with the rotation of the spindle 344. The spindle 344 includes first and second arm projections 362, 364 positioned within a first lever arm slot 371 defined by the first lever arm 368 and a second lever arm slot 374 defined by the second lever arm 370. The first and second lever arm slots 371, 374 are each sized larger than the respective first and a second arm projections 362, 364 to allows each arm projection 362, 364 the freedom to move within each lever arm slot 371, 374 as the spindle 344 is rotated without always transferring the rotation of the spindle 344 to the first and second lever arms 368, 370.

Each lever arm 368, 370 is configured to interface with the bolt 304 via a bolt projection 372 to move the bolt 304 from the retracted position to the extended position so as to allow a user to lock the gate latch from the outside of the gate. As shown, the projection 372 is configured to travel within in a housing slot 373, defined by the main housing 326. Depending on the handing configuration of the bolt 304, the first lever arm 368 can either move the bolt 304 to the extended position in a direction from the second side 322 to the first side 320, or the second lever arm 370 can move the bolt 304 to the extended position from the first side 320 to the second side 322.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A gate latch comprising:

a bolt;

a housing having at least one slot configured to removably receive at least a portion of the bolt;

a pair of biasing blocks with a biasing spring in-between disposed within the housing, the bolt selectively interfaces with one block of the pair of biasing blocks such that the bolt is moveable along a bolt axis between at least an extended position and a retracted position while being biased towards the extended position;

a trigger body disposed at least partially within the housing and movable along a bolt retention axis between at least an engaged position and a disengaged position, the trigger body configured to interface with the bolt and retain the bolt in the extended position in the engaged position, the bolt axis orthogonal to the bolt retention axis;

a spindle rotatably mounted to the housing and defining a central axis, the central axis orthogonal to both the bolt axis and the bolt retention axis, the spindle configured to interface with the bolt and move the bolt towards the extended position when rotated;

a cam rotationally fixed to the spindle and configured to move the bolt from the extended position towards the retracted position via contact with the trigger body when rotated; and a selector switch moveable between a left-handed position and a right-handed position, the selector switch coupled to the cam such that the cam axially moves along the central axis between the left- and right-handed positions.

2. The gate latch of claim 1, wherein the housing includes indicia adjacent the selector switch.

3. The gate latch of claim 1, wherein the cam includes first and second legs configured to selectively contact corresponding first and second arms of the trigger body.

4. The gate latch of claim 1, wherein the trigger body includes a lip for manually moving the trigger body towards the disengaged position.

5. The gate latch of claim 4, further comprising a cover having an aperture, the cover configured to couple to the housing and allow access to the lip.

6. The gate latch of claim 4, wherein manual movement of the trigger body towards the disengaged position is independent from rotational movement of the spindle.

7. The gate latch of claim 1, wherein the bolt includes a pushing extension that is disposed outside of the housing.

8. The gate latch of claim 1, wherein the spindle includes a pair of lever arms configured to selectively interface with the bolt to move the bolt from the retracted position towards the extended position.

9. The gate latch of claim 1, wherein the trigger body is biased towards the engaged position.

10. A gate latch comprising:

a housing having a first side and an opposite second side;

a bolt assembly supported by the housing and operational along a bolt axis, the bolt assembly including:

a bolt moveable between at least an extended position and a retracted position relative to the first side of the housing, wherein the bolt includes a tab; and at least one biasing block configured to interface with the bolt and bias the bolt towards the retracted position, wherein the at least one biasing block includes a pair of biasing blocks, the tab engages with one block of the pair of biasing blocks for movement between the extended position and the retracted position;

a bolt retention assembly supported on the housing and operational along a bolt retention axis between at least an engaged position and a disengaged position, the bolt retention assembly including:

a trigger body configured to interface with the bolt in the engaged position and retain the bolt in the extended position; and a bolt movement assembly supported on the housing and operational along a central axis, the central axis orthogonal to the bolt axis and the bolt retention axis, the bolt movement assembly including:

a spindle configured to interface with the bolt and move the bolt towards the extended position upon rotation; and a cam rotationally fixed to the spindle and configured to interface with the trigger body and move the trigger body towards the disengaged position upon rotation.

11. The gate latch of claim 10, wherein each of the first and second sides of the housing include a slot configured to at least partially receive the bolt, the bolt being configured to be removed from the housing and flipped to extend and retract from the second side.

12. The gate latch of claim 11, further comprising a selector switch configured to move the cam axially along the central axis and correspond to the side that the bolt extends and retracts from.

13. The gate latch of claim 10, wherein the bolt includes a pair of opposite projections, a respective projection of the pair of opposite projections engages with the trigger body when in the engaged position to retain the bolt in the extended position.

14. The gate latch of claim 10, wherein the bolt includes a spindle projection that engages with the spindle to move the bolt towards the extended position when the spindle is rotated.

15. The gate latch of claim 10, wherein the trigger body is moveable towards the disengaged position via a manual pull on the trigger body and via a rotation of the cam.

16. The gate latch of claim 15, wherein the manual pull movement of the trigger body is independent from rotation movement of the spindle.

17. The gate latch of claim 10, wherein the trigger body is biased towards the engaged position.

18. A method of changing handing position in a gate latch, the method comprising:

providing a gate latch in a first handed position, the gate latch having a bolt supported on a housing, the bolt engaged with a first biasing block such that the bolt is moveable between at least an extended position and a retracted position relative to a first side of the housing and while being biased towards the extended position, a trigger body is disposed at least partially within the housing and movable between at least an engaged position and a disengaged position, the trigger body configured to interface with the bolt and retain the bolt in the extended position in the engaged position, a spindle is rotatably mounted to the housing and configured to interface with the bolt and move the bolt towards the extended position when rotated, and a cam is rotational fixed to the spindle and configured to move the bolt from the extended position towards the retracted position via contact with the trigger body when rotated;

removing the bolt from the housing;

switching positions of the bolt on the housing to a second handed position, in the second handed position the bolt engages with a second biasing block such that the bolt is moveable between the extended position and the retracted position relative to a second side of the housing; and moving a selector switch to correspond to the side of the housing that the bolt extends and retracts from in the second handed position, wherein the selector switch is coupled to the cam such that the cam axially moves along a rotation axis of the spindle between the first handed position and the second handed position.

* * * * *